United States Patent [19]
Sakoda et al.

[11] Patent Number: 5,999,580
[45] Date of Patent: Dec. 7, 1999

[54] DATA SIGNAL TIMING CORRECTION DEVICE, FILTER DEVICE, AND WIRELESS PORTABLE COMMUNICATION TERMINAL

[75] Inventors: Kazuyuki Sakoda; Mitsuhiro Suzuki, both of Chiba, Japan

[73] Assignee: Sony Corporation, Tokyo, Japan

[21] Appl. No.: 08/915,761

[22] Filed: Aug. 21, 1997

[30] Foreign Application Priority Data

Sep. 9, 1996 [JP] Japan .................... P08-260297

[51] Int. Cl.$^6$ ............................................ H04L 7/00
[52] U.S. Cl. ................... 375/354; 375/371; 375/372; 370/516
[58] Field of Search ............................. 375/206, 354, 375/371, 372; 348/443; 386/20; 370/516, 503

[56] References Cited

U.S. PATENT DOCUMENTS

| | | | |
|---|---|---|---|
| 3,676,585 | 7/1972 | Kaneko et al. .................. | 348/443 |
| 4,691,248 | 9/1987 | Nishimoto .................... | 386/20 |
| 5,699,391 | 12/1997 | Mazzurco et al. ............. | 375/372 |
| 5,835,543 | 11/1998 | Mazzurco et al. ............. | 375/372 |

*Primary Examiner*—Stephen Chin
*Assistant Examiner*—Chieh M. Fan
*Attorney, Agent, or Firm*—Jay H. Maioli

[57] ABSTRACT

A data signal timing correcting device has a timing difference detecting circuit that detects a direction and magnitude of a timing shift of a data signal relative to a reference clock signal by calculating a difference between a number of reference signal clock pulses and one symbol of the data signal. A timing correction circuit receives a detection result from the timing difference detecting circuit and provides a trigger signal to a data memory that has stored in it the data signal. A counter loads a value of the difference from the different detecting circuit and, depending upon the magnitude and direction of a detected timing shift, the trigger signal is shifted to an earlier or later timing by one clock pulse of the reference clock signal.

9 Claims, 7 Drawing Sheets

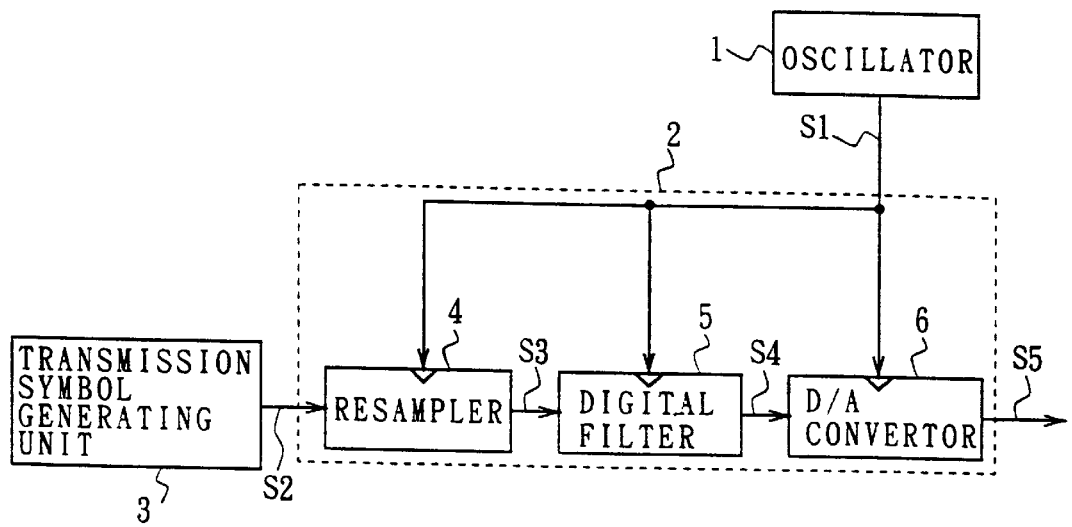
FIG. 1 (PRIOR ART)
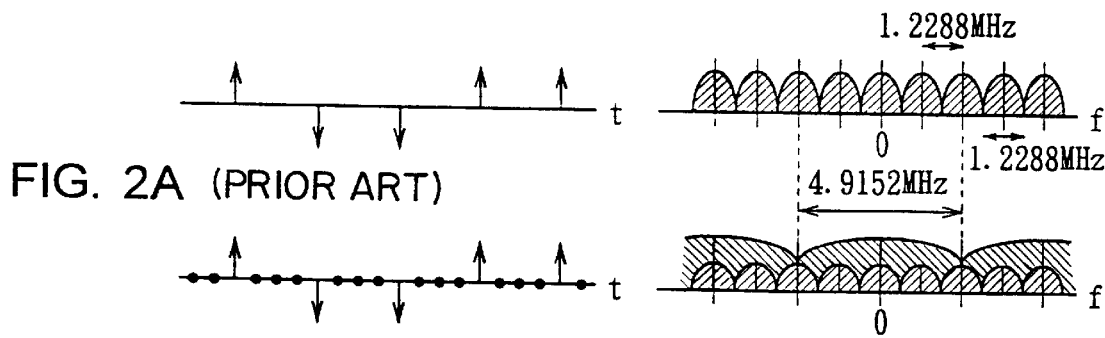
FIG. 2A (PRIOR ART)
FIG. 2B (PRIOR ART)
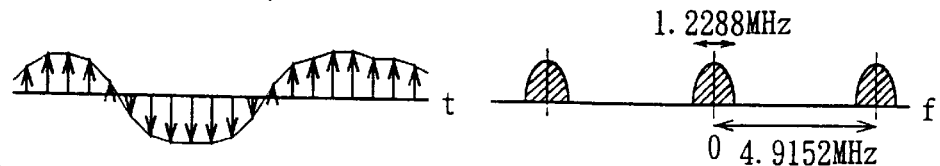
FIG. 2C (PRIOR ART)

DATA SIGNAL TIMING CORRECTION DEVICE, FILTER DEVICE, AND WIRELESS PORTABLE COMMUNICATION TERMINAL

BACKGROUND OF THE INVENTION

1. Field of the Invention

The present invention relates to a data signal timing correction device, a filter device, and a wireless portable communication terminal device, and more particularly, is suitably applied to a data signal timing correction device, a filter device, and a wireless portable communication terminal device which are used in a wireless communication system to communicate through a transmission line of which a usable frequency band is limited.

2. Description of the Related Art

In this type of wireless communication terminal device, a data signal to be transmitted (hereinafter, referred to as a baseband signal) is generated as a digital signal. The baseband signal is limited within a prescribed frequency band by a filtering processing, and then is converted into an analog signal. A carrier wave is modulated with the baseband signal converted into the analog signal, and then the modulation signal is transmitted through a prescribed transmission line of which a usable frequency band is limited.

FIG. 1 generally shows a circuit configuration of a transmission filter device and its vicinity provided in a wireless communication terminal device such as a portable telephone. A clock signal S1 generated at an oscillator 1 is supplied to a transmission filter 2 as a reference clock. Further, a transmission symbol generating unit 3 generates a baseband signal S2 to be transmitted and sends it to the transmission filter 2. Note that, in a CDMA-PCS which is an information communication system using portable telephones and which has been proposed in the United States, frequency of the baseband signal S2 is regulated as 1.2288 [MHZ] by J-STD-008 of the ANSI standard, and the wireless communication terminal device based on the standard generates the baseband signal S2 with the frequency. Also, frequency of the clock signal S1 is generated with 4.9152 [MHZ] which is four times as much as the baseband signal S2 because the transmission filter 2 performs a quadruple-oversampling on the baseband signal S2. In this connection, the frequency of the clock signal S1 is not only limited to 4.9152 [MHZ] but also it can be generated in accordance with a magnification of oversampling the baseband signal S2.

The transmission filter 2 is comprised of a resampler 4, a digital filter 5, and a digital-to-analog converter (hereinafter, referred to as D/A converter) 6, and drives based on the clock signal S1 which is supplied from the oscillator 1. The baseband signal S2 which is supplied from the transmission symbol generating unit 3 is inputted to the resampler 4. The resampler 4 performs the oversampling processing on the baseband signal S2 with the clock signal S1 having an integral multiple frequency of the baseband signal S2. The resampler 4 sends out a pulse signal S3 obtained by the oversampling processing, to the digital filter 5. The digital filter 5 quantizes the pulse signal S3 in accordance with a prescribed frequency characteristic. The digital filter 5 sends out a quantization signal S4 obtained by the quantization, to the D/A converter 6. The D/A converter 6 converts the quantization signal S4 into a transmission signal S5 being an analog signal. Then, the wireless communication terminal device extracts only a prescribed frequency band from the transmission signal S5 by an analog low-pass filter (not shown) to transmit it.

More specifically, as shown in FIG. 2A, the baseband signal S2 generated at the transmission symbol generating unit 3 is a train of impulses of 1.2288 [MHZ], and when observing the baseband signal S2 on the frequency axis, one band having 1.2288 [MHZ] width appears every 1.2288 [MHZ] repeatedly.

As shown in FIG. 2B, the resampler 4 widens one band of the baseband signal S2 to 4.9152 [MHZ] width by oversampling the baseband signal S2 with 4.9152 [MHZ] frequency which is a quadruple frequency of 1.2288 [MHZ]. The one band having 4.9152 (MHZ) width contains four pieces of information being the original 1.2288 [MHZ]. More precisely, in the oversampling processing, three pieces of information which is "0" are filled between trains of impulses of the baseband signal S2 (points between impulses in FIG. 2B).

As shown in FIG. 2C, a band of the pulse signal S3 obtained by oversampling is narrowed by the digital filter 5. The quantization signal S4 obtained by the band control is sent out via the D/A converter 6, so that the transmission filter 2 sends out a signal for forming an envelope curve shown in FIG. 2C. The signal sent from the transmission filter 2 is outputted through the analog low-pass filter, and thereby the wireless communication terminal device extracts and outputs only a prescribed frequency band.

The wireless communication terminal device can widen the interval between frequency bands of the baseband signal S2 by performing the oversampling processing with a prescribed magnification at the transmission filter 2, and can easily extract the prescribed frequency band by the analog low-pass filter without utilizing highly efficient frequency characteristic. Thus, in the wireless communication terminal device, a load can be reduced by decreasing the characteristic required for the analog low-pass filter.

Further, in the wireless communication system to communicate between the wireless communication terminal device and the base station by radio as represented by a cellular system, the wireless communication terminal device synchronizes transmission timing of a transmission signal with the other party of communication. Especially, in a system using a code division multiple access (CDMA) scheme as a multiplexing system of a transmission signal, highly efficient timing synchronization becomes prerequisite.

In FIG. 3, the same reference numerals are applied to correspond to FIG. 1, numeral 10 generally shows a wireless communication terminal device according to the CDMA scheme. The wireless communication terminal device receives a signal transmitted from the other party via the base station and moreover, transmits the transmission signal S5 to the other party at transmission timing determined according to timing of a reception signal.

In the wireless communication terminal device 10, a reception signal S6 being an analog signal is inputted to an analog-to-digital converter 11 (hereinafter, referred to as A/D converter 11) to be converted into a digital signal S7. The A/D converter 11 outputs the obtained digital signal S7 to a demodulator 12. The demodulator 12 demodulates the digital signal S7 modulated by a prescribed modulation form at the transmission side, and outputs it to a reception symbol processing unit 13 as a reception symbol S8 which is packet data in which information is stored. In addition, in this time, the demodulator 12 detects the timing of the digital signal S7 and outputs a control signal S9 having a voltage level corresponding to the detection result. The reception symbol processing unit 13 converts the reception symbol S8 into an output signal such as an audio signal to output it. Note that, the A/D converter 11, the demodulator 12, and the reception symbol processing unit 13 are supplied with the clock signal S1 from the oscillator 1, and drive at the timing the clock signal S1 as a reference clock.

On the other hand, a transmission clock generating unit 14 generates a reference clock signal S10 with a frequency corresponding to the voltage level of the control signal S9 to supply it to the transmission symbol generating unit 3 and moreover, generates a reference clock signal S11 having an integral multiple frequency of the reference clock signal S10 to supply it to the transmission filter 2. More precisely, the transmission clock generating unit 14 is comprised of a voltage controlled oscillator (VCO) and changes the frequency of the reference clock signal S10 to be generated in accordance with the voltage level of the control signal S9. Note that, for the frequency of the reference clock signal S11, an integral multiple frequency of the reference clock signal S10 is selected because of oversampling the baseband signal S2.

The transmission symbol generating unit 3 generates the baseband signal S2 which is a transmission symbol, on the basis of the reference clock signal S10, and sends it to the transmission filter 2. The baseband signal S2 is inputted to the resampler 4 to be oversampled with a magnification based on the frequency of the reference clock signal S11. The pulse signal S3 which is output from the resampler 4 is supplied to the digital filter 5, and the band of the pulse signal S3 is narrowed. The quantization signal S4 obtained by narrowing the band is converted into the transmission signal S5 being an analog signal via the D/A converter 6. The wireless communication terminal device 10, after sending out the transmission signal S5 from the transmission filter 2, extracts and outputs only the prescribed frequency band by the analog low-pass filter (not shown).

As described above, the wireless communication terminal device 10 synchronizes the timing to transmit the transmission signal S5 with the timing which is obtained from the reception signal S6. Accordingly, the wireless communication terminal device 10 extracts timing information from the digital signal S7 which is obtained by A/D converting the reception signal S6, by the demodulator 12 to detect whether or not the difference between the timing information and the timing information in the wireless communication terminal device 10 exists. As a result of the detection, when it is determined that the difference between the timing information which is obtained from the reception signal S6 and the internal timing information exists, the wireless communication terminal device 10 adjusts the internal timing to correct the difference. More precisely, the wireless communication terminal device 10 temporarily changes frequencies of the reference clock signals S10 and S11 which are generated by the transmission clock generating unit 14 from the control signal S9 which is outputted from the demodulator 12, in order to synchronize the internal timing with the timing information which is obtained from the reception signal S6.

FIG. 4, in which the corresponding parts of FIG. 3 are designated with the same reference numerals, generally shows the internal configuration of the demodulator 12, and that the input digital signal S7 is supplied to demodulation units 15 to 17 and a synchronous trapping/tracking circuit 18. The synchronous trapping/tracking circuit 18 detects an optimal phase of prescribed diffusion lines to be combined with the digital signal S7, and informs each of the demodulation units 15 to 17 of the phase. Each of the demodulation units 15 to 17 combines the digital signal S7 with the prescribed diffusion lines by using the phase detected at the synchronous trapping/tracking circuit 18.

More specifically, the reception signal S6 which is received at the wireless communication terminal device 10 is a signal generated by combining an information signal with the diffusion lines at the transmission side, and its own signal of which the amplitude is decreased and the phase is shifted is added to the original transmission signal by the action of multi-pass on the transmission line. Therefore, the demodulator 12 combines the same diffusion lines as those combined at the transmission side with the digital signal S7 while shifting the phase in the synchronous trapping/tracking circuit 18. When the phase of diffusion lines to be combined while shifting is equal to the phase of diffusion lines combined at the transmission side, the value of correlation appears as a peak point. Thus, by combining the phase of diffusion lines while shifting, the peak point having the highest correlation value can be easily detected and the optimal phase of the diffusion lines to be combined with the digital signal S7 can be obtained.

Further, since the reception signal S6 which is received by the wireless communication terminal device 10 includes a plurality of signals of which the phases are shifted from each other by the action of the multipath as described above, a plurality of peak points of the correlation value will be obtained in the case where the diffusion lines are combined while shifting the phases.

The synchronous trapping/tracking circuit 18 selects three phases capable of obtaining especially high peak values from a plurality of thus obtained peak points, and respectively distributes and informs the phases to the demodulation units 15 to 17 as phase information signals S12. Each of demodulation units 15 to 17 demodulates the digital signal S7 by combining the diffusion lines with the informed phase to output the obtained information signal to a signal combining unit 19. The signal combining unit 19 sets the phase of the information signals which are supplied, combines the information signals by weighting according to the strength of each signal, and outputs it as the reception symbol S8.

Further, there are cases where a part of a transmission path is cut off due to the transfer of the wireless communication terminal device, and thereby out of the detected three phases capable of obtaining especially high peak values, some phases drop to the undetectable level. The synchronous trapping/tracking circuit 18 detects the phase capable of constantly obtaining the high peak value, and if the phase which is used for demodulating the digital signal S7 at the demodulation unit 15, 16 or 17 drops to the undetectable level, the synchronous trapping/tracking circuit 18 newly selects the phases capable of obtaining the high peak value and respectively informs the demodulation units 15 to 17 of the phases again.

Further, in the wireless communication terminal device according to the CDMA scheme, the timing of transmitting the transmission signal S5 is determined based on the timing of the first arrived phase out of the three phases capable of obtaining the high peak value. Here, there is a case where the timing of the first arrived phase capable of obtaining an especially high peak value varies momentarily due to the cutoff of a transmission path or soft hand off. In this case, the wireless communication terminal device 10 (FIG. 3) newly detects the timing of the first arrived phase capable of obtaining the high peak value at the synchronous trapping/tracking circuit 18, and outputs the control signal S9 to the transmission clock generating unit 14 in accordance with the detected timing. The transmission clock generating unit 14 controls the timing of transmitting the transmission signal S5 by speeding up or delaying the frequencies of the reference clock signals S10 and S11 on the basis of the control signal S9.

The wireless communication terminal device 10 synchronizes with the timing at which the other party transmits the transmission signal S5 by determining the transmission timing of the transmission signal S5 based on the timing of the reception signal S6. In the case where the transmission timing of the transmission signal S5 varies due to the cutoff of the transmission path, the wireless communication terminal device 10 can continuously secure the synchronization of transmission timing by adjusting the frequencies of the reference clock signals S10 and S11 in accordance with the timing which is newly obtained based on the reception signal S6.

According to the foregoing construction, the wireless communication terminal device 10 determines the transmission timing of the transmission signal S5 at the timing which is obtained from the reception signal S6 as described above, and controls the frequency of the reference clock signal S10 generated by the transmission clock generating unit 14 accordingly in order to generate the baseband signal S2. In the case of changing the transmission timing according to the control, the demodulator 12 changes the voltage level of the control signal S9 to be output in order to supply the control signal S9 to the transmission clock generating unit 14 which is the VCO. Thus, the frequencies of the reference clock signals S10 and S11 which are generated by the transmission clock generating unit 14 can be controlled and the transmission timing can be synchronized with the timing of reception signal S6.

However, since output of the VCO generally varies greatly because of the small change of voltage level, there is a problem that the extremely high accuracy is required for controlling the voltage level.

Further, in the case where the frequency of the reference clock signal S10 is controlled and changed in order to synchronize with the timing of the reception signal S6, the transmission symbol generating unit 3 changes the time range per one symbol unit of the baseband signal S2. For example, in case of speeding up the transmission timing, the transmission symbol generating unit 3 temporarily shortens the time range per one symbol of the baseband signal S2 with respect to the timing of clock signal S1. On the other hand, in the case of delaying the transmission timing, the transmission symbol generating unit 3 temporarily widens the time range per one symbol. The wireless communication terminal device 10 changes the transmission timing of the transmission signal S5 in this way.

However, thus generated baseband signal S2 includes jitter elements, so that there is a problem that spectrum distortion occurs in the transmission signal S5.

Furthermore, in the case of changing and synchronizing the transmission timing of the transmission signal S5 with the timing which is newly obtained based on the reception signal S6 due to the cut off of the transmission path, it is considered that the new transmission timing varies rapidly and greatly as compared with the former timing. In addition, in the case of transmitting a carrier wave which is modulated with the transmission signal S5 generated based on greatly changed timing, there is a problem that the base station through which the carrier wave is transmitted from the transmission side to the reception side cannot follow the greatly changing transmission timing.

SUMMARY OF THE INVENTION

In view of the foregoing, an object of this invention is to provide a filter device and a wireless communication terminal device in which the spectrum distortion caused by jitter elements can be easily decreased while maintaining sure signal transmission.

A data signal timing correction device of the present invention comprises: a timing difference detecting means, to which a data signal and a reference clock signal are supplied, for detecting direction and magnitude of timing shift of the data signal with respect to the reference clock signal; a data storage means, after supplying the data signal and a trigger signal, for storing the data signal and sequentially outputting the stored data signal in response to the trigger signal; and a timing correcting means, in the case where the detection resultant signal of the timing difference detecting means indicates that the magnitude of timing shift is zero, for supplying the trigger signal to the data storage means with a period corresponding to a predetermined number of clock of the reference clock signal, and on the other hand, in the case where the detection resultant signal indicates that the magnitude of timing shift is not zero, for supplying the trigger signal to the data storage means at earlier or later timing than timing of the period by one clock of the reference clock signal, only the number of times equal to the number of clock corresponding to the magnitude of timing shift, in accordance with the direction of the timing shift.

In the case where the timing shift occurs in the output timing of the data signal with respect to the reference signal, the jitter elements including in the data signal caused by the timing shift can be dispersed in the direction of time by correcting the output timing of the data signal by shortening or widening by one clock timing in accordance with the timing shift.

A wireless portable communication terminal of this invention comprises: a demodulating means for demodulating the reception signal to the former information signal and detecting timing of the reception signal, and in the case where change in transmission timing of the transmission signal is necessary on the basis of the detection result, for outputting a first control signal; a transmission symbol generating means for generating a baseband signal on the basis of a first reference clock signal or a second reference clock signal having a prescribed frequency; a signal generating means for generating the first reference clock signal; a timing control means, to which the first reference clock signal is supplied, for supplying the first reference clock signal to the transmission generating means when the first control signal is not supplied, and the other hand, for generating a second reference signal by dividing frequency of the first reference clock and supplying the second reference signal to the symbol generating means when the first control signal is supplied; a timing difference detecting means for detecting direction and magnitude of timing shift of the data signal with respect to the first reference clock signal; a data storage means, to which the data signal and a trigger signal are supplied, for storing the data signal and sequentially outputting the stored data signal in response to the trigger signal; a timing correcting means, to which the reference clock signal and the detection resultant signal of the timing difference detecting means are supplied, for supplying the trigger signal to the data storage means at a period corresponding to a prescribed number of clock of the reference clock signal when the detection resultant signal indicates that the magnitude of the timing shift is zero, and on the other hand, when the detection resultant signal indicates that the magnitude of the timing shift is not zero, for supplying the trigger signal to the data storage means at earlier or later timing than timing of the period by one clock of the reference clock signal, only the number of times equal to the clock number corresponding to the magnitude of timing shift, according to the direction of timing shift; a sampling means for sampling the data signal which is output from the data storage means, with the reference clock signal; and a digital filter for being supplied with a sample signal which is output from the sampling means.

When the timing shift in the direction of delaying time with respect to the first reference signal is detected, the output timing of the baseband signal is corrected, and when the timing shift in the direction of speeding up is detected, the counter value indicating the timing shift in the direction of delaying time is decreased, thereby the timing shift which occurs in the direction of delaying time can be set off against the timing shift that occurs in the direction of speeding up time by the timing change or the baseband signal which is asynchronous to the first reference signal.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 a block diagram showing a conventional transmission filter device and its peripheral construction;

FIGS. 2A to 2C are schematic diagrams explaining a signal processing by the transmission filter device of FIG. 1;

DETAILED DESCRIPTION OF THE EMBODIMENT

Preferred embodiments of this invention will be described with reference to the accompanying drawings.

Figure 3:
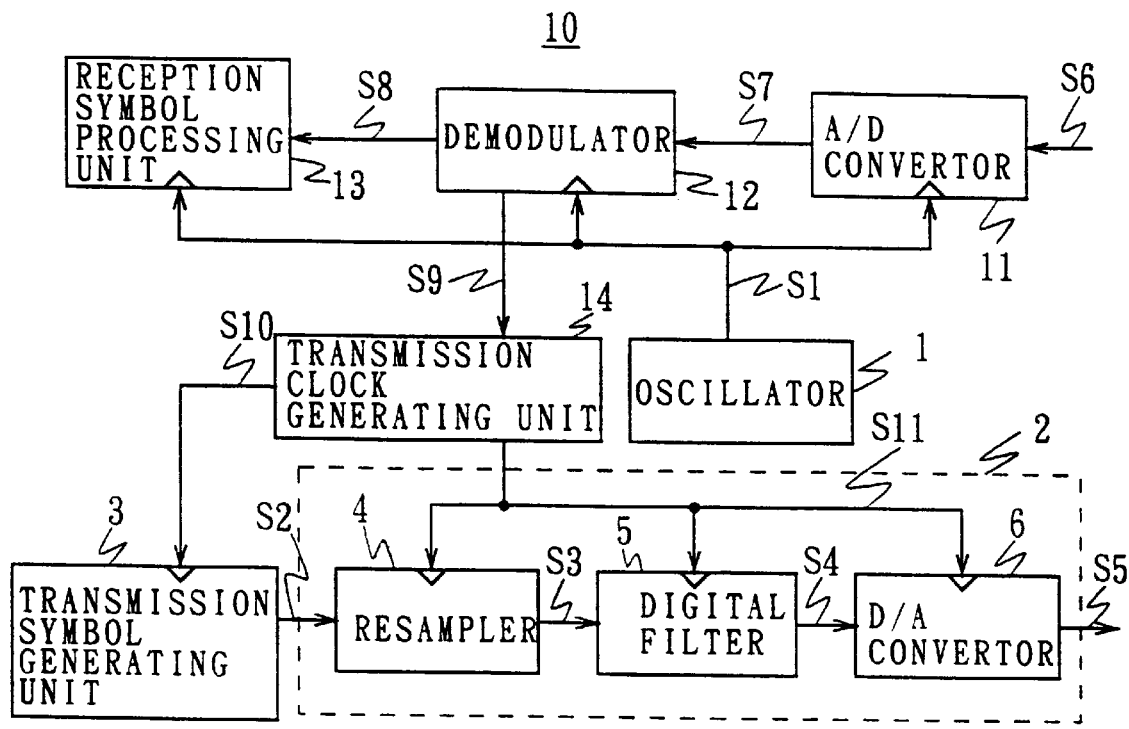
FIG. 3 is a block diagram showing the construction of a wireless communication terminal device according to the CDMA scheme.
Figure 4:
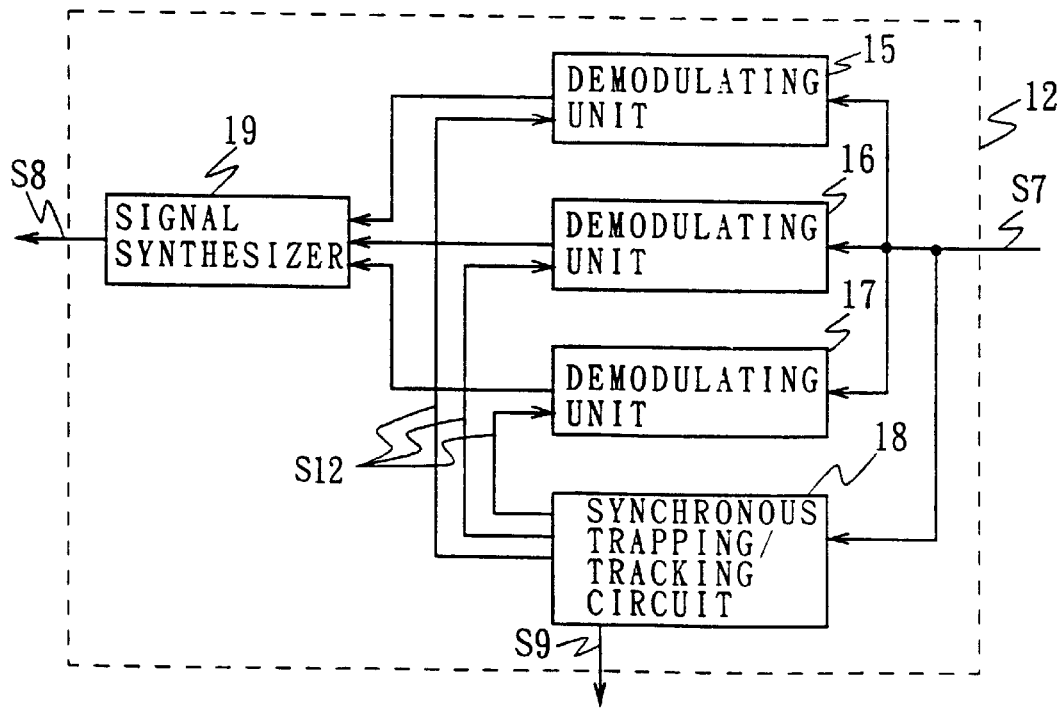
FIG. 4 is a block diagram showing an internal construction of a demodulator.
Figure 5:
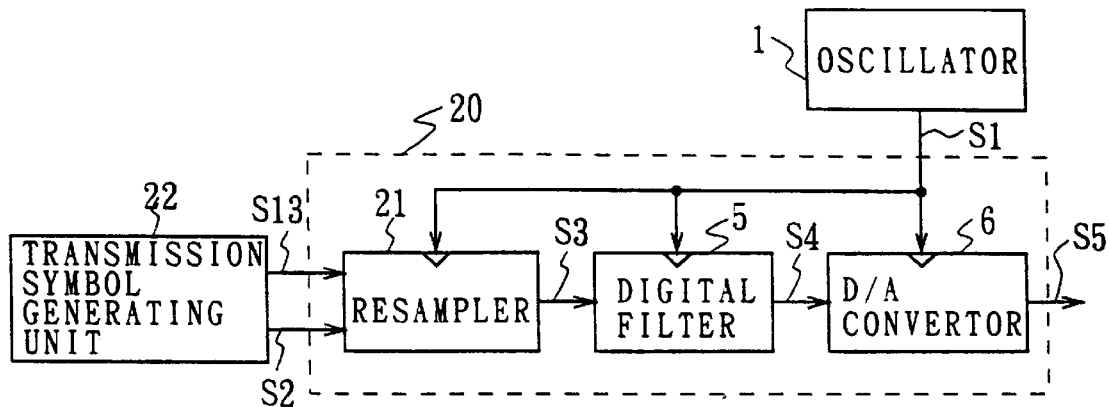
FIG. 5 is a block diagram showing a transmission filter device and its peripheral construction of the present invention.

FIG. 5 shows a filter device of the present invention, in which the same reference numerals are applied to parts corresponding to FIG. 3. A transmission filter 20 comprises a resampler 21, a digital filter 5, and a D/A converter 6 which are supplied with a clock signal S1 generated by an oscillator 1. Moreover, a transmission symbol generating unit 22 generates a baseband signal S2 to be transmitted and a timing signal S13 showing boundaries of every one symbol unit of the baseband signal S2, and transmits both signals to the transmission filter 20.

The baseband signal S2 and the timing signal S13 which are supplied from the transmission symbol generating unit 22 are inputted to the resampler 21. Here, in the resampler 21, the baseband signal S2 would be oversampled with the magnification and a control procedure in case of changing the oversampling magnification that have been stored in advance. More specifically, the resampler 21 is arranged to sixteenfold oversample the baseband signal S2, and the control procedure in case of changing the magnification is stored by the setting described later.

The resampler 21 compares the inputted timing signal S13 and the clock signal S1 to calculate the time range of one symbol unit of the baseband signal S2 that is equivalent to the number of clock timings of the clock signal S1, i.e., it is equivalent to the number of pulses of the clock signal S1. More precisely, the resampler 21 starts the pulse detection of the clock signal S1 at the time of detecting the starting position of one symbol unit in the baseband signal S2 and counts the number of clock pulses until the pulse wave is redetected from the timing signal S13. If the calculation result is sixteen, the resampler 21 performs sixteenfold oversampling to the baseband signal S2 as it is to send an obtained pulse signal S3 to the digital filter 5.

On the other hand, if the calculation result is not sixteen, the resampler 21 temporarily changes the oversampling magnification and performs the processing for changing the transmission timing of the transmission signal S5.

Figure 6A:
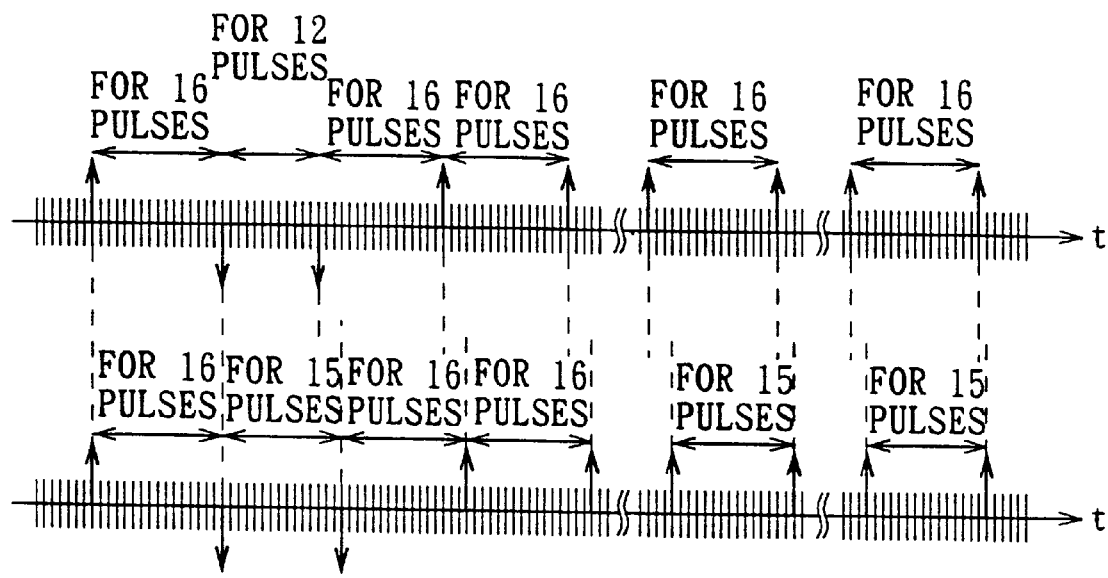
FIGS. 6A and 6B are time charts explaining an adjusting procedure of a transmission timing of a resampler shown in FIG. 1.

As shown in FIG. 6A, for example, one symbol unit having the time range corresponding to twelve pulses is inputted temporarily at the time when the baseband signal S2 is being inputted with the time range corresponding to sixteen pulses of the clock signal S1 as one symbol unit. In this case, the resampler 21 temporarily changes the magnification of oversampling from sixteenfold to fifteenfold to speed up the transmission timing. Then, the resampler 21 returns the magnification of oversampling to sixteenfold, and after the expiration of a prescribed time interval, changes the oversampling magnification to fifteenfold again. In this way, the fifteenfold oversampling processing is repeated several times (four times in this case) at predetermined time intervals, thereby the resampler 21 gradually resolves the timing shift that occurred in the baseband signal S2.

Figure 6B:
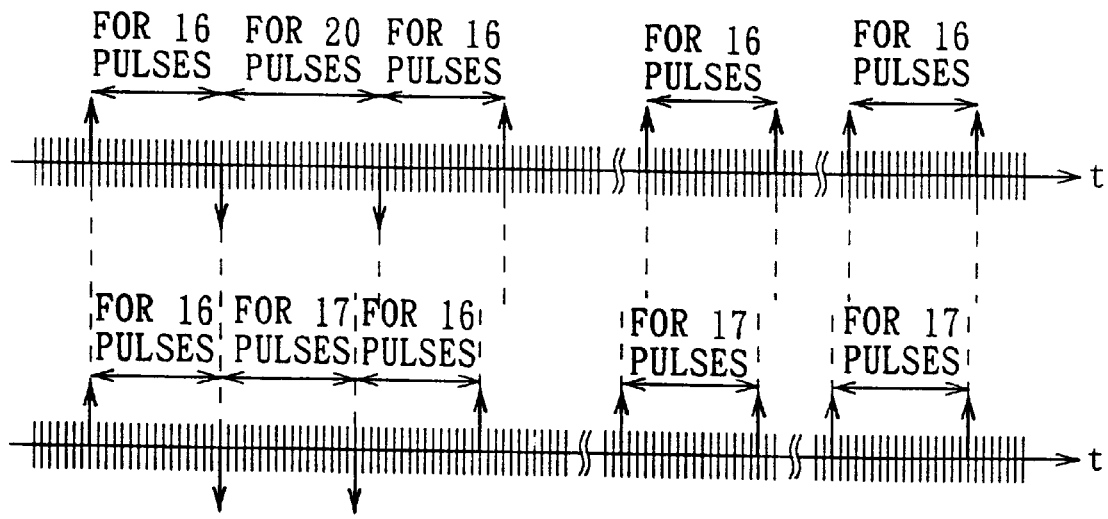

Further, as shown in FIG. 6B, one symbol unit having the time range corresponding to twenty pulses is temporarily inputted at the time when the baseband signal S2 is being inputted with the time range corresponding to sixteen pulses of the clock signal S1 as one symbol unit. In this case, the resampler 21 temporarily changes the oversampling magnification from sixteenfold to seventeenfold to delay the transmission timing. Then, the resampler 21 returns the oversampling magnification to sixteenfold, and after the expiration of a predetermined time interval, changes the oversampling magnification to seventeenfold again. In this way, the seventeenfold oversampling processing is repeated several times (four times in this case) at predetermined time intervals, thereby the resampler 21 gradually resolves the timing shift that occurred in the baseband signal S2.

Accordingly, the resampler 21 adjusts transmission timing by temporarily changing the oversampling magnification of the baseband signal S2 and gradually resolves the timing shift by dispersing the timing shift in the direction of time, in order to control jitter elements. The resampler 21 sends thus obtained pulse signal S3 to the digital filter 5. The digital filter 5 performs a filtering processing on the pulse signal S3 on the basis of the frequency of the clock signal S1 and sends a resulting quantization signal S4 to the D/A converter 6. The D/A converter 6 converts the quantization signal S4 to an analog signal to output it as a transmission signal S5.

Figure 7:
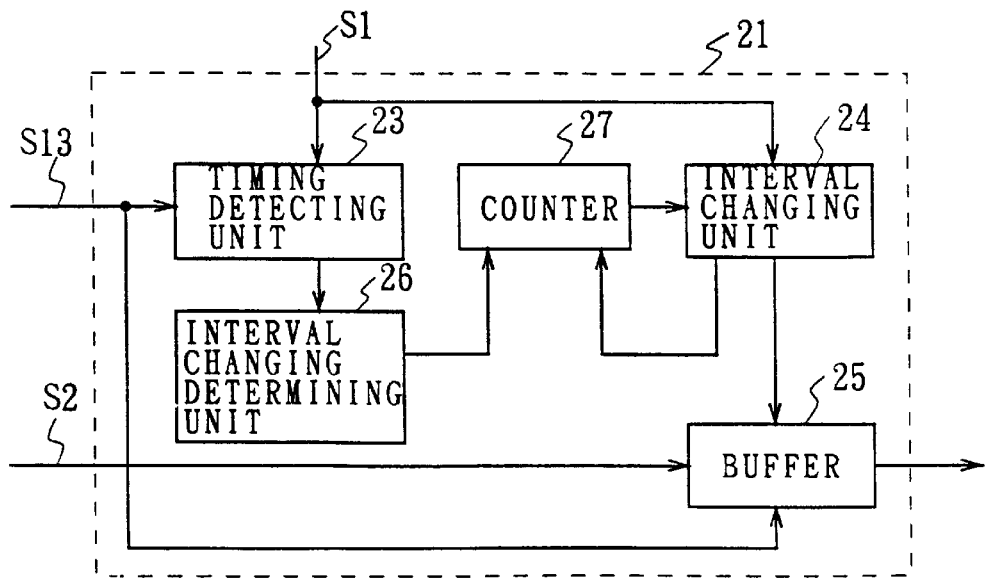
FIG. 7 is a block diagram showing an internal construction of a resampler shown in FIG. 5.

FIG. 7 shows a part of the internal construction of the resampler 21, and it changes the oversampling magnification of the baseband signal S2, that is, adjusts the transmission timing of the transmission signal S5, by the configuration described below. The resampler 21 inputs the clock signal S1 which is supplied from the oscillator 1 (FIG. 5) to a timing detecting unit 23 and an interval changing unit 24, and simultaneously supplies the timing signal S13 which is given from the transmission symbol generating 22 (FIG. 5) to the timing detecting unit 23 and supplies the baseband signal S2 to the buffer unit 25. At this point, assume that the frequency of the clock signal S1 and the frequency of the baseband signal S2 are synchronized (frequency of the clock signal S1 is an integral multiple of the frequency of the baseband signal S2).

The timing detecting unit 23 detects a respective pulse wave of the timing signal S13 and the clock signal S1 and then detects the number of pulses of the clock signal S1 per one symbol unit of the baseband signal S2. Thus, the timing detecting unit 23 calculates that the time range per one symbol unit of the baseband signal S2 is equivalent to the interval of the number of pulses of the clock signal S1 and outputs the calculation result to an interval change determining unit 26.

The interval change determining unit 26 receives the calculation result and then judges at every one symbol unit whether or not the time range per one symbol unit is equivalent to the interval having sixteen pulses of the clock signal S1. If the interval change determining unit 26 judges that one symbol unit is the interval having sixteen pulses of the clock signal S1, it performs nothing on the symbol unit.

Accordingly, if no instruction is received, the interval changing unit 24 sends the trigger signal to the buffer unit 25 once whenever the pulse of clock signal S1 is inputted sixteen times as the processing according to the sixteenfold oversampling magnification as the initial setting. The buffer unit 25 temporarily stores the inputted baseband signal S2 and sends the baseband signal S2 per one symbol unit having the time range according to the oversampling magnification in accordance with the input of the trigger signal. In this case, since the oversampling magnification is sixteenfold, the baseband signal S2 is sent with the interval in which the pulse of the clock signal S1 is inputted sixteen times as the time range of one symbol unit.

On the other hand, if the interval change determining unit 26 judges that the time range of one symbol unit is not the interval of sixteen pulses of the clock signal S1, it calculates that one symbol unit of the baseband signal S2 has a number of shifts with respect to the time range of sixteen pulses of the clock signal S1 and informs the counter 27. For example, in the case where the baseband signal S2 is inputted temporarily with one symbol unit (FIG. 6A) having the time range of twelve pulses of the clock signal S1 (i.e., in the case of speeding up timing), the interval change determining unit 26 informs the counter of the shift of one symbol unit of the baseband signal S2 with respect to the time range of sixteen pulses of the clock signal S1 as "4". Here, the direction of delaying timing is treated as plus and the direction of speeding up timing is treated as minus.

The counter 27 holds information of a timing shift of the baseband signal S2 with respect to the clock signal S1 which is supplied from the interval change determining unit 26 as a counter value. The counter 27 informs the interval changing unit 24 of the counter value, and the interval changing unit 24 sends the trigger signal once by shorting it for one pulse at the timing of the clock signal S1 to the buffer 25 in response to the counter value. When the counter 27 receives the notification indicating that the trigger signal has been sent, it reduces the counter value by one to renew it. Moreover, when new information on the timing shift is supplied from the interval change determining unit 26, the counter 27 renews the counter value by adding a new timing shift to the counter value held at that time. The counter 27 informs the interval changing unit 24 of a new counter value whenever the counter value is renewed.

The interval changing unit 24 controls the buffer 25 in order to change the oversampling magnification in accordance with the counter value which is outputted from the counter 27, and adjusts the time range per one symbol unit of the baseband signal S2 to be sent. The procedure will be described in detail as follows.

Time intervals according to counter values to be outputted in advance are memorized and set respectively in the interval changing unit 24. For example, in the case where the number of timing shift of the baseband signal S2 with respect to the clock signal S1 which is informed by the counter value is more than "3" in the plus or minus direction, the time interval is two hundred. Further, in the case where the number of timing shift is "2" in the plus or minus direction, the time interval is three hundred. Furthermore, in the case where the number of time shift is "1" in the plus or minus, the time interval is four hundred. The interval changing unit 24, as well as detecting the clock signal S1 as occasion calls, sets the time interval according to the counter value as described above at the time when the counter value is received from the counter 27. The interval changing unit 24 counts the passage of time from changing the symbol interval last time with the number of pulses of the clock signal S1, and changes the symbol interval considering the time interval described above, the time passed from the last symbol interval change, and the counter value outputted from the counter 27.

Upon receiving a notification of a counter value from the counter 27, the interval changing unit 24 starts the processing to correct the timing shift, i.e., the processing to change the oversampling magnification. The interval changing unit 24 compares the counter value outputted from the counter 27 and the time passed from changing the time range of the baseband signal S2 last time (the number of input pulse waves of the clock signal S1) with a predetermined time interval according to the aforementioned counter value. If the passage of time is large enough with respect to the time interval according to the notified counter value, the interval changing unit 24 sends the trigger signal to the buffer 25 at the timing when the oversampling magnification is changed. More precisely, when the counter value is plus (when delaying the timing), the interval changing unit 24 sends the trigger signal at the time interval for 17 pulses of the clock signal S1, and when the counter value is minus (when speeding up the timing), it sends the trigger signal at the time interval for 15 pulses of the clock signal S1.

On the other hand, in the case where the passage of time is small as compared with the time interval according to the notified counter value, the interval changing unit 24 waits until the time interval passes, and after the passage of the time interval, it sends the trigger signal to the buffer 25 at the timing when the oversampling magnification is changed. Moreover, as well as sending the trigger signal, the interval changing unit 24 informs the counter 27 of the change of the counter value. Responding to the notification, the counter 27 renews the counter value by adding one, or reducing one. Note that, in the case where the oversampling magnification is not changed, i.e., the counter value stored in the counter 27 is zero, or sufficient time has not passed since the oversampling magnification has been changed last, the interval changing unit 24 sends the trigger signal at the time interval for sixteen pulse waves of the clock signal S1.

The buffer unit 25 sends the temporarily stored baseband signal S2 for every one symbol unit of each time range in response to the trigger signal which is outputted from the interval changing unit 24. The output baseband signal S2 is supplied to the oversampling unit (not shown) and the oversampling processing is performed with the magnification according to one symbol unit being each time range.

Thus, in the case where the resampler 21 detects the timing shift of the baseband signal S2 which is inputted with respect to the clock signal S1, the resampler 21 changes the time range per one symbol unit temporarily, and by repeating the change several times at the fixed time intervals, shifted timing is gradually resolved.

According to the foregoing construction, the baseband signal S2 generated by the transmission symbol generating unit 22 is inputted to the transmission filter 20 together with the timing signal S13 which is generated by the transmission symbol generating unit 22. Here, one symbol unit of the baseband signal S2 is to become the time range for sixteen pulse waves of the clock signal S1, however, there are cases where the time range temporarily and suddenly becomes widened or shortened due to the change of transmission timing. The variations of the time range become jitter elements included in the baseband signal S2, and in the case where the oversampling is performed based on the symbol timing of the baseband signal S2 including the jitter elements, spectrum distortion occurs in the transmission signal S5 which is outputted.

Accordingly, in the case where the timing shift occurs with respect to the clock signal S1 because the time range per one symbol unit of the baseband signal S2 is temporarily changed, the transmission filter 20 changes the oversampling magnification temporarily by the resampler 21 in accordance with the magnitude of timing shift of the baseband signal S2 with respect to the clock signal S1. Thereby, the transmission filter 20 can resolve the timing shift with respect to the clock signal S1 and can easily decrease the spectrum distortion which occurs in the transmission signal S5.

Furthermore, in case of changing the oversampling magnification by the resampler 21, the transmission filter 20 changes the sixteenfold oversampling magnification to seventeenfold or fifteenfold, and repeats the change for a fixed number of times corresponding to the magnitude of shift at the prescribed time intervals, in order to gradually set the timing.

More specifically, for example, one symbol unit for twenty pulses width of the clock signal S1 is generated temporarily in the baseband signal S2 of which the time range of one symbol unit is formed for sixteen pulses width of the clock signal S1. In order to resolve this temporarily, if the oversampling magnification is changed to twentyfold, the timing setting processing can be done by changing the magnification once. However, if the transmission timing of the transmission signal S5 is changed by sudden and substantial change of sampling magnification, the change speed of transmission timing largely deviates from the speed following the timing change by the base station regulated by the ANSI standard J-STD-008, and the base station cannot follow the transmission signal S5 and large spectrum deviation occurs in the transmission signal S5.

In the case of changing the transmission timing temporarily by changing the oversampling magnification by the resampler 21, the transmission filter 20 detects the magnitude of a timing shift per one symbol unit of the baseband signal S2 with respect to the clock signal S1 by the timing detecting unit 23 and the interval change determining unit 26. The detected magnitude of the timing shift is outputted to the counter 27 to be controlled, and the oversampling magnification is changed by plus 1 or minus 1, and the processing is repeated several times corresponding to the magnitude of the timing shift. Moreover, a prescribed time interval which is determined by the interval change determining unit 26 in accordance with the detected magnitude of the timing shift is controlled by the interval changing unit 24 and the oversampling magnification is changed per the time interval.

Thus, by repeating the change of oversampling magnification by adding 1 or subtracting 1 for the number of times corresponding to the magnitude of the timing shift and at the time interval corresponding to the magnitude of the timing shift, the transmission filter 20 gradually resolves the timing shift that occurs in the baseband signal S2. Thus, the transmission filter 20 avoids temporary deviation of the transmission timing of transmission signal S5 from the follow-up speed of the base station side regulated by the ANSI standard J-STD-008 and can maintain sure transmission of the transmission signal S5.

According to the foregoing construction, the time range of the baseband signal S2 per one symbol unit with respect to the clock signal S1 is detected from the timing signal S13 at the timing detecting unit 23. In the case where the occurrence of one symbol unit of the time range which does not conform to the sixteenfold oversampling based on the clock signal S1 is detected, the baseband signal S2 temporarily stored in the buffer unit 25 is sent with the time range of fifteenfold or seventeenfold pulses of the clock signal S1, at the time intervals which are set by the interval change determining unit 26 while the interval changing unit 24 monitors, by dividing into the number of times corresponding to the number of timing shifts with respect to the time range conforming to sixteenfold oversampling.

Thus, in the case where a transmission timing shift occurs in the baseband signal S2 because one symbol unit of the time range not conforming to the sixteenfold oversampling occurs, the transmission filter 20 can remove jitter elements of the baseband signal S2 without deviating from the follow-up speed of the base station by gradually resolving the timing shift divided into multiple number of times, and thereby, spectrum distortion which occurred in the transmission signal S5 due to jitter elements can be easily decreased while maintaining the certain signal transmission.

Figure 8:
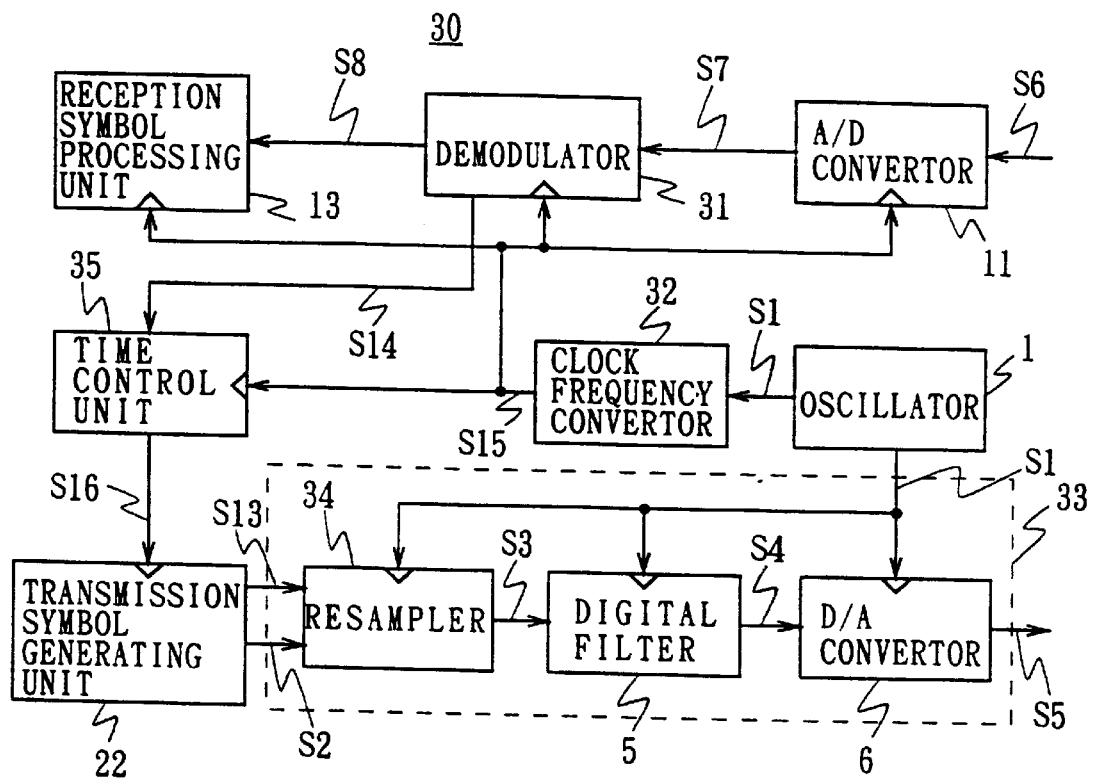
FIG. 8 is a block diagram showing the construction of a wireless communication terminal device of the present invention.

FIG. 8 shows a wireless communication terminal device using the filter device shown in FIG. 5, in which the same reference numerals are applied to parts corresponding to FIGS. 5 and 7. Numeral 30 generally shows a wireless communication terminal device according to the CDMA scheme, and the wireless communication terminal device receives a signal transmitted from the other party via the base station as a reception signal S6. The reception signal S6 being an analog signal is converted into a digital signal S7 by an analog-to-digital converter 11 (hereinafter, referred to as A/D converter 11), and then is demodulated to the former information signal by the demodulator 31. Thus obtained reception symbol S8 is converted into a signal such as an audio signal by the reception symbol processing unit 13 and is outputted. Moreover, the demodulator 31 performs the timing detection in the case of demodulating the digital signal S7, and judges according to the detection result whether to speed up or delay the transmit timing, and outputs the magnitude of timing displacement to be changed as an information signal S14. At this point, a reference clock signal S15 generated by frequency-converting the clock signal S1 by a clock frequency converter 32 is supplied to the A/D converter 11, the demodulator 31, and the reception symbol processing unit 13 to drive these based on the signal S15.

The oscillator 1, after generating a clock signal S1 having the frequency of 19.8[MHz], supplies it to the clock frequency converter 32 and the transmission filter 33. The transmission filter 33 supplies the clock signal S1 which is supplied, to the resampler 34, the digital filter 5, and the D/A converter 6.

On the other hand, the clock frequency converter 32 converts the frequency of clock signal S1 having 19.8[MHz] frequency to generate a reference clock signal S15 having 19.6608[MHz] frequency, and as well as supplying it to the A/D converter 11, the demodulator 31, and the reception symbol processing unit 13 as described above, the clock frequency convertor 32 supplies it to a time control unit 35. That is, since the wireless communication terminal device 30 is based on the CDMA scheme, it is regulated that the baseband signal S2 is 1.2288 [MHZ], and thus, it becomes necessary to have a signal having the frequency synchronizing to 1.2288 [MHZ] when generating the baseband signal S2. Accordingly, in the wireless communication terminal device 30, by frequency-converting the clock signal S1 having 19.8 [MHZ] frequency at the clock frequency converter 32, the reference clock signal S15 synchronized to 1.2288 [MHZ] (i.e., formed of an integral multiple) is generated.

More specifically, the clock frequency converter 32 artificially widens the intervals between pulse waves by extracting the pulse wave from the inputted clock signal S1 for every prescribed interval in order to generate the reference clock signal S15 having the lower desired frequency than the former frequency (in this case, 19.6608 [MHZ]). For example, it is assumed that the frequency of the clock signal S1 which is generated by the oscillator 1 is fout and the frequency of the reference clock signal S15 which is generated by frequency-converting the clock signal S1 is fin, the average interval to extract the pulse wave can be obtained by the following equation (1):

$$\frac{fin}{fin - fout} \quad (1)$$

More specifically, by dispersing the difference between the former frequency and the desired frequency with respect to the former frequency, an average interval in case of converting the former frequency into the desired frequency can be obtained. In this case, since fout is 19.6608 [MHZ] and fin is 19.8 [MHZ], the following equation (2) is obtained by substituting these values into the equation (1).

$$\frac{fin}{fin - fout} = \frac{19.8 \text{ [MHz]}}{19.8 \text{ [MHz]} - 19.6608 \text{ [MHz]}} = \frac{19.8 \text{ [MHz]}}{0.1392 \text{ [MHz]}} = \frac{4125}{29} \quad (2)$$

And it is clear that, by extracting the pulse wave at the interval of 4125/29, the clock signal S1 having 19.8 [MHZ] can be frequency-converted into the reference clock signal S15 having 19.6608 [MHZ].

The time control unit 35, by inputting thus generated reference clock signal S15 having 19.6608 [MHZ] and dividing the frequency into sixteen, generates the reference clock signal S16 having the same frequency of 1.2288 [MHZ] as the baseband signal S2, and supplies it to the transmission symbol generating unit 22. Moreover, the time control unit 35 temporarily changes the timing, i.e., frequency, of the reference clock signal S16 which is supplied to the transmission symbol generating unit 22, in accordance with the information signal S14 which is supplied from the demodulator 31. In this case, the time control unit 35 decreases magnification to divide the frequency in case of speeding up the transmission timing, and increases the magnification to divide the frequency in case of delaying the transmission timing.

The transmission symbol generating unit 22, as well as generating the baseband signal S2 on the basis of the reference clock signal S16, generates a timing signal S13 indicating the time range of one symbol unit of the baseband signal S2, in order to supply these signals to a transmission filter 33. Accordingly, for example, in case of speeding up the transmission timing, one symbol unit having a shorter time range than the time range in case of not changing the transmission timing occurs in the baseband signal S2, and in case of delaying the transmission timing, one symbol unit having a wider time range than the time range in case of not changing the transmission timing occurs in the baseband signal S2.

The transmission filter 33 supplies the baseband signal S2 and the timing signal S13 sent from the transmission symbol generating unit 22 to the resampler 34. In general, the resampler 34 performs the oversampling on the baseband signal S2 with the magnification corresponding to the ratio of the frequency of the clock signal S1 with respect to the frequency of the baseband signal S2. More specifically, the frequency of the baseband signal S2 is regarded temporarily as 1.2375 [MHZ] and sixteenfold oversampling will be performed. Moreover, the resampler 34 detects the time range of one symbol unit of the baseband signal S2 shown by the timing signal S13 with respect to the clock signal S1, and temporarily changes the oversampling magnification according to the time range.

Figure 9:
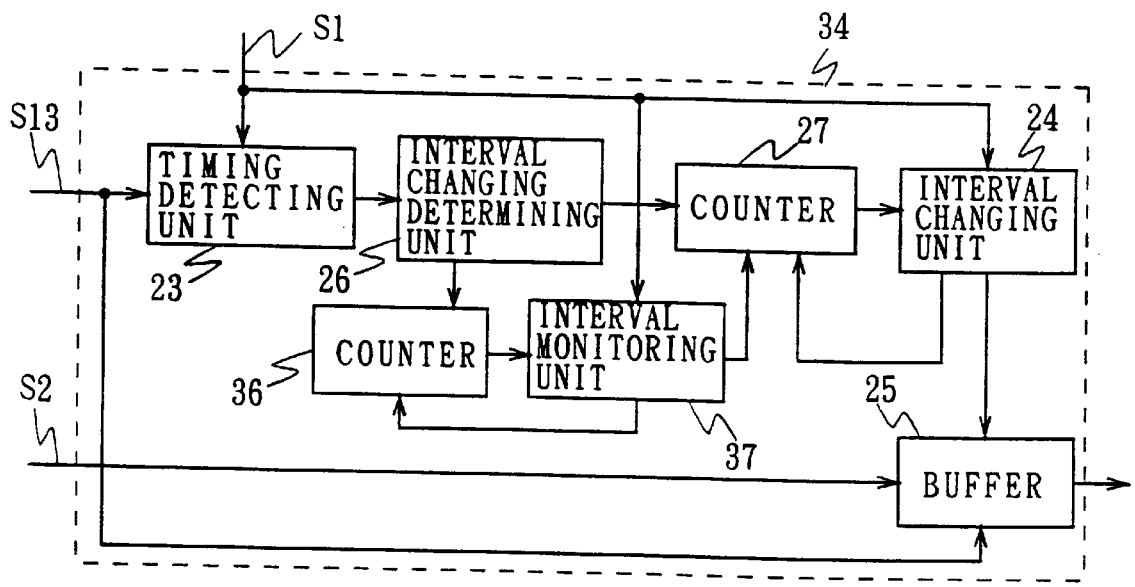
FIG. 9 is a block diagram showing the internal construction of a resampler shown in FIG. 8.

As shown in FIG. 9, the resampler 34 inputs and temporarily stores the baseband signal S2 in the buffer unit 25. Also, the resampler 34 inputs the timing signal S13 and the clock signal S1 to the timing detecting unit 23 to detect the timing shift between these signals. The resampler 34 controls the timing shift in the minus direction due to speeding up the transmission timing and the timing shift in the plus direction due to delaying the transmission timing separately, and sends the temporarily stored baseband signal S2 to the buffer unit 25 per one symbol unit of the time range corresponding to the detected time shift.

The resampler 34 detects the time range with respect to the clock signal S1 for every one symbol unit of the baseband signal S2 by the timing detecting unit 23. The timing detecting unit 23 constantly detects pulse waves of the clock signal S1 and the timing signal S13 respectively, and calculates how many pulse waves of the clock signal S1 are detected between pulse waves of the timing signal S13. At this point, since each pulse wave of the timing signal S13 shows the boundary of each symbol unit of the baseband signal S2, the timing detecting unit 23 obtains the time range per each symbol unit of the baseband signal S2 with respect to the clock signal S1 by calculating the number of detected pulse waves of the clock signal S1 from the time when the pulse wave of the timing signal S13 is detected to the time when the pulse wave is detected next. The timing detecting unit 23 informs the interval change determining unit 26 of the obtained calculation result.

In the case where no instruction is received from the interval change determining unit 26 and the counter 27, the interval changing unit 24 outputs the trigger signal to the buffer unit 25 once whenever the pulse of the clock signal S1 is inputted sixteen times as the processing corresponding to the sixteenfold oversampling magnification as the initial setting. The buffer unit 25 is arranged to temporarily store the inputted baseband signal S2 and sends the baseband signal S2 per one symbol unit formed by the time range corresponding to the oversampling magnification in accordance with the input of the trigger signal. In this case, since the oversampling magnification is sixteen times, the baseband signal S2 is sent with the interval in which the pulse of the clock signal S1 is inputted sixteen times as the time range of one symbol unit.

The interval change determining unit 26, after receiving the calculation result which is outputted from the timing detecting unit 23, judges per each symbol unit whether or not the interval is for sixteen pulses of the clock signal S1. At this point, the interval change determining unit 26 performs nothing on one symbol unit which is judged as the interval for sixteen pulses of the clock signal S1.

On the other hand, when it is judged that the interval is not for sixteen pulses of the clock signal S1, the interval change determining unit 26 calculates how many shifts one symbol unit of the baseband signal S2 has with respect to the time range of sixteen pulses of the clock signal S1 in order to inform the counter 17 or 36 of the calculation result. For example, in the case where the need for delaying the transmission timing arises and one symbol unit having the time range of seventeen pulse waves of the clock signal S1 is inputted, the number of timing shift becomes "+1" because the detected time range is "17" with respect to the reference time range "16". Moreover, in the case where the need for speeding up the transmission timing arises and one symbol unit having the time range of fifteen pulse waves of the clock signal S1 is inputted, the number of timing shift becomes "−1" because the detected time range is "15" with respect to the reference time range "16".

The interval change determining unit 26 supplies the number of timing shifts formed of the difference between the reference time range and the detected time range to the counter 27 or 36. At this point, the interval change determining unit 26 supplies the number of timing shifts to the different counter depending on whether the number of timing shifts formed of an obtained difference of a time range is a plus value or minus value. For example, if the number of timing shifts is a plus value, the interval change determining unit 26 supplies the obtained number of timing shifts to the counter 27. And if the number of timing shifts is a minus value, the interval change determining unit 26 supplies the number of timing shifts to the counter 36.

The counter 27 holds the number of timing shifts being a plus value from the interval change determining unit 26 as the counter value. The counter 27 informs the interval changing unit 24 of this counter value and simultaneously, when it receives a notification indicating that the trigger signal is sent once from the interval changing unit 24, renews the counter value by reducing by one. Moreover, if new information on the number of timing shifts is supplied from the interval change determining unit 26, the counter 27 renews the counter value by adding the new number of timing shifts to the counter value being held at that time. The counter 27 informs the interval changing unit 24 of a renewed counter value whenever it renews the counter value.

The interval changing unit 24 adjusts the time range per one symbol unit of the baseband signal S2 by controlling the buffer 25 in order to change the oversampling magnification in accordance with the counter value which is outputted from the counter 27. More specifically, it is performed according to the procedure described below.

The predetermined time interval corresponding to the counter value which is outputted from the counter 27 is set and stored in the interval changing unit 24, and when the interval changing unit 24 receives the counter value from the counter 27, it selects the time interval corresponding to the counter value. The interval changing unit 24 compares the selected time interval and the time passed after changing the time range to send the baseband signal S2 last time, in order to judge whether or not sufficient time has passed. In the case where sufficient time has passed, the interval changing unit 24 sends out the trigger signal at the interval for seventeen pulse waves of the clock signal S1. Thus, one symbol unit of the baseband signal S2 formed of the time range for seventeen pulse waves of the clock signal S1 is sent out from the buffer 25. Moreover, if sufficient time has not passed, the interval changing unit 24 waits until the time interval selected in accordance with the counter value passes, and after it has passed, the interval changing unit 24 sends out the trigger signal at the time interval for 17 pulse waves of the clock signal S1. In the case where the interval changing unit 24 does not change the time range according to the notification from the counter 27 as described above, it sends out the trigger signal at the time interval for sixteen pulse waves of the clock signal S1.

On the other hand, the counter 36 holds the number of timing shifts formed of a minus value which are supplied from the interval change determining unit 26 as the counter value. The counter 36 informs the interval monitoring unit 37 of the counter value and renews the counter value by adding one when receiving a notification indicating that the trigger signal is sent out once from the interval monitoring unit 37. Furthermore, when it receives information on the number of new timing shifts newly from the interval change determining unit 26, it renews the counter value by adding the number of new timing shifts to the counter value being held at that time. The counter 36 informs the interval monitoring unit 37 of new counter value whenever it renews the counter value.

The interval monitoring unit 37 sends out the trigger signal to the counter 27 at the prescribed time intervals in accordance with the counter value being a minus value which is informed from the counter 36 to reduce the counter value held by the counter 27 by one. More precisely, it will be performed according to the procedure described below.

The interval monitoring unit 37 is supplied with the clock signal S1 and detects the clock signal S1 whenever necessary. Moreover, the interval monitoring unit 37 beforehand memorizes the prescribed time interval which is set according to the counter value which is received from the counter 36. The interval monitoring unit 37 selects the time interval corresponding to the counter value from the aforementioned time intervals when it receives the counter value, and when the time passed from the time when the trigger signal is outputted last based on the number of detected pulse waves of the clock signal S1 is more than the prescribed time interval, it outputs the trigger signal to the counter 27. And when it is less than the prescribed time interval, the interval monitoring unit 37 waits until the prescribed time passes, and outputs the trigger signal to the counter 27 at the time of confirming its passing.

When the counter 27 receives the trigger signal from the interval monitoring unit 37, it renews the counter value being held inside by reducing it by one. In this case, if the held counter value becomes minus value, the counter 27 remains in a waiting state without informing the interval monitoring of anything.

The resampler 34, while controlling the number of timing shifts having a plus value or a minus value as the counter value at the counter 27 or 36, makes each counter value the counter value to indicate the timing shift in the plus direction and the minus direction combined at the counter 27, and adjusts the time range of each one symbol unit of the baseband signal S2 which is outputted from the buffer unit 25 on the basis of the trigger signal which is outputted from the interval changing unit 24. The outputted baseband signal S2 is supplied to an oversampling unit (not shown) and oversampling processed with a magnification corresponding to one symbol unit formed of each time range. Thus, when the resampler 34 detects the timing shift with respect to the clock signal S1 from the baseband signal S2 which is inputted, the resampler 34 changes the time range per one symbol unit temporarily and repeats the change several times into the prescribed time intervals, thereby the timing shift is gradually resolved.

The resampler 34 performs the correction processing of the timing shift in the directions of plus and minus according to the control procedure described below.

Figure 10:
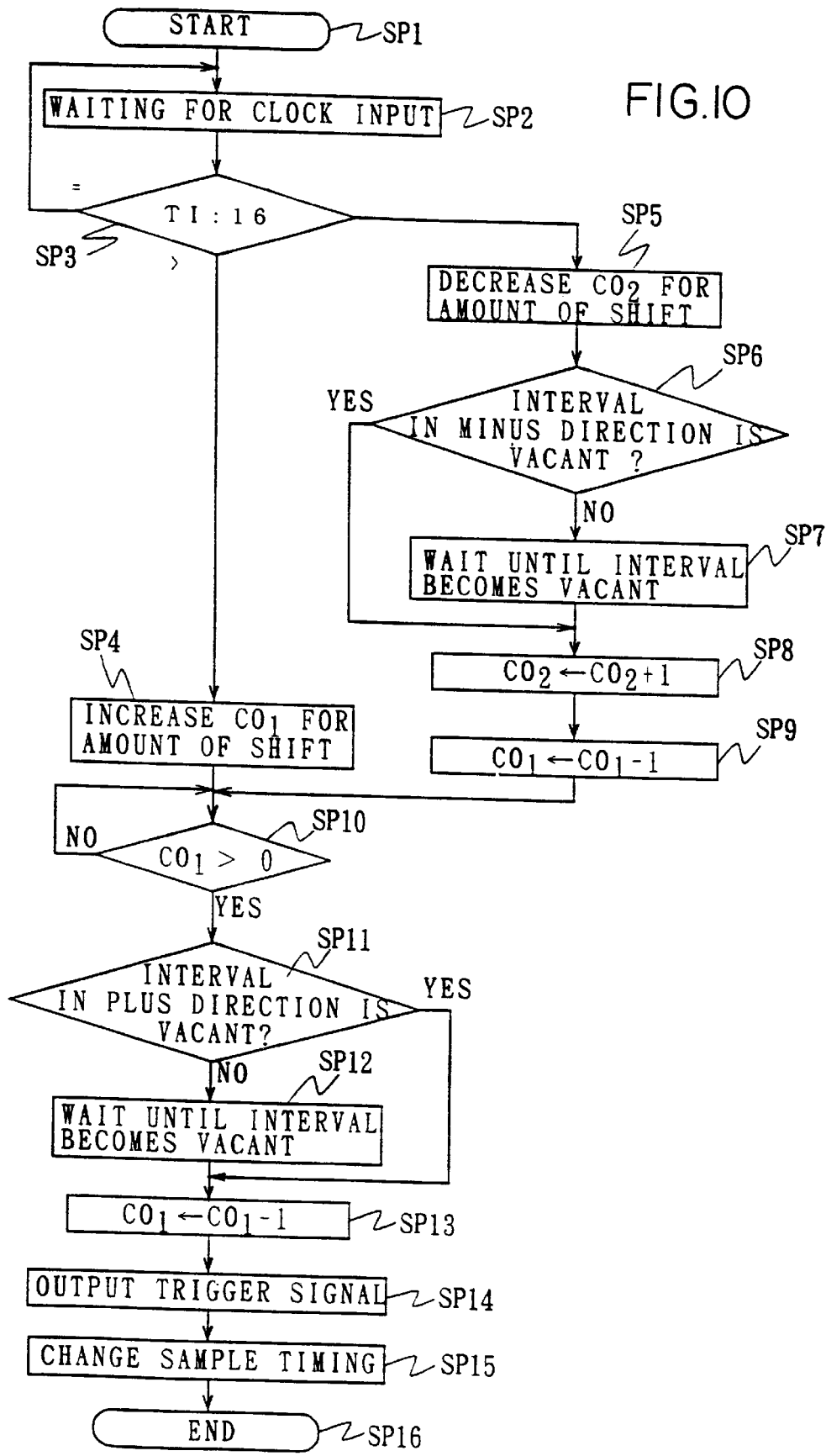
FIG. 10 is a flowchart showing the control procedure of the transmission timing of the resampler shown in FIG. 8.

As shown in FIG. 10, the resampler 34 starts the procedure at step SP1. After starting the procedure, the resampler 34 waits for inputting the pulse waves of the timing signal S13. At the time when the input of the pulse wave is detected, the resampler 34 detects the number of inputs of the clock signal S1 from the detection of the pulse wave until the next pulse wave is detected. Thus, the time range per one symbol unit of the baseband signal S2 with respect to the clock signal S1 can be obtained.

At step SP3, the resampler 34 calculates the time range of one symbol unit of the baseband signal S2 from the number of inputs of detected clock signal S1 and the number of reference inputs, that is sixteen, and judges based on the time range whether or not the timing shift occurs in the transmission timing. More specifically, by subtracting the number of inputs of the detected clock signal S1 detected from the reference input numbers, that is sixteen, the resampler 34 judges whether the obtained value is more than zero or less than zero. At this point, if the obtained value is zero, assuming that the timing shift does not occur in the transmission timing, the resampler 34 returns to step SP2 and continues the processing procedure. During this period, the interval changing unit 24 sends out the trigger signal at the usual interval (for example, sixteen). Moreover, if the obtained value is more than zero, assuming that the timing shift in the plus direction occurs in the transmission timing, the resampler 34 proceeds to step SP4. On the other hand, if the obtained value is less than zero, assuming that the timing shift in the minus direction occurs in the transmission timing, the resampler 34 proceeds to the step SP5. Note that, the step SP2 and step SP3 are independently executed by the timing detecting unit 23 and the interval change determining unit 26 and do not depend on the operation of the other units. Also, during this period, the other units perform their own processing independently regardless of the processing of the timing detecting unit 23 and the interval change determining unit 26.

In the case where timing shift in the minus direction occurs in the transmission timing, the resampler 34 reduces the counter value CO2 held by the counter 36 by the value obtained at step SP3 and renews the counter value CO2 at step SP5. Then, at step SP6, the resampler 34 judges whether or not the time interval to be set according to the counter value held by the counter 36 has passed after shifting the timing in the minus direction. If it has not passed, at the step SP7, the resampler 34 places the interval monitoring unit 37 in a waiting state until the setting time passes, and after the time has passed, proceeds to step SP8. Moreover, if the setting time has passed, the resampler 34 jumps to step SP8 to renew the counter value by adding one to the counter value CO2 held by the counter 36. At step SP9, the resampler 34 sends out the trigger signal to the counter 27 from the interval monitoring unit 37, and the counter 27 renews the counter value by reducing the counter value CO1 held according to the input of the trigger signal by one. Then, the procedure proceeds to step SP10. The procedures of steps SP5 to SP8 are independently executed by the counter 36 and the interval monitoring unit 37 and do not depend on the operating condition of the other units. Moreover, the other units perform their own processing respectively regardless of the processes of the counter 36 and the interval monitoring unit 37.

On the other hand, in the case where timing shift in the plus direction occurs in the transmission timing, at step SP4, the resampler 34 renews the counter value CO1 held by the counter 27 by adding the value obtained at step SP3. Then the resampler 34 proceeds to step SP10.

In the case where timing shift in the plus direction occurs in the transmission timing and the counter value CO1 is renewed (SP4) by adding and in the case where timing shift in the minus direction occurs in the transmission timing and the counter value CO1 is renewed (SP9) by reducing the value by renewing the counter value CO2 and outputting the trigger signal (SP5 to SP8), the resampler 34 judges at step SP10 whether or not the counter value CO1 is the plus value. In the case where the counter value CO1 is the plus value, the resampler 34 continues the procedure. Moreover, if the counter value CO1 is the minus value, the resampler places the counter 27 in a waiting state until the counter value CO1 becomes the plus value.

In the case where the counter value CO1 is the plus value, the resampler 34 judges at step SP11 whether or not the time interval to be set by the interval monitoring unit 37 in accordance with the counter value held by the counter 27 has passed from the time when the trigger signal is outputted last. If it has not passed, at the step SP12, the resampler 34 places the interval changing unit 24 in a waiting state until the setting time passes, and after the time has passed, it proceeds to the step SP13. Moreover, if the setting time has passed, the resampler 34 jumps to step SP13 and renews the counter value CO2 held by the counter 27 by reducing the value by one. At the same time, at step SP14, the resampler 34 sends out the trigger signal at the timing of delaying for one pulse at the clock signal S1 (the time range of seventeen pulse waves of S1) from the interval changing unit 24 to the buffer unit 25. The buffer unit 25 transmits one symbol unit of the temporarily stored baseband signal S2 with the time range of seventeen pulse waves of the clock signal S1 in accordance with the input of the trigger signal. Then, the oversampling unit (not shown) which receives the output baseband signal S2 performs the oversampling processing with a magnification corresponding to the time range of each symbol unit, i.e., sixteen times or seventeen times, at step SP15. At step SP16, the resampler 34 terminates the processing procedure to change the oversampling magnification for one time.

Since the processes of the step SP4 and steps SP10 to SP14 are independently executed by the counter 27 and the interval changing unit 24, they do not depend on the operating conditions of the other units. Moreover, during this period, the other units perform their own processes regardless of the processes of the counter 27 and the interval changing unit 24. Accordingly, the change of oversampling magnification for one time does not mean the termination of all processes.

The resampler 34 resolves the timing shifts both in the plus direction and the minus direction by the aforementioned correction processing of the timing shift and reduces the timing shift in case of changing the transmission timing according to the timing of the reception signal S6 (FIG. 8) and the timing shift based on jitter elements which is generated in the baseband signal S2 caused by the asynchronous factor between the frequency of clock signal S1 and the frequency of baseband signal S2.

Figure 11A:
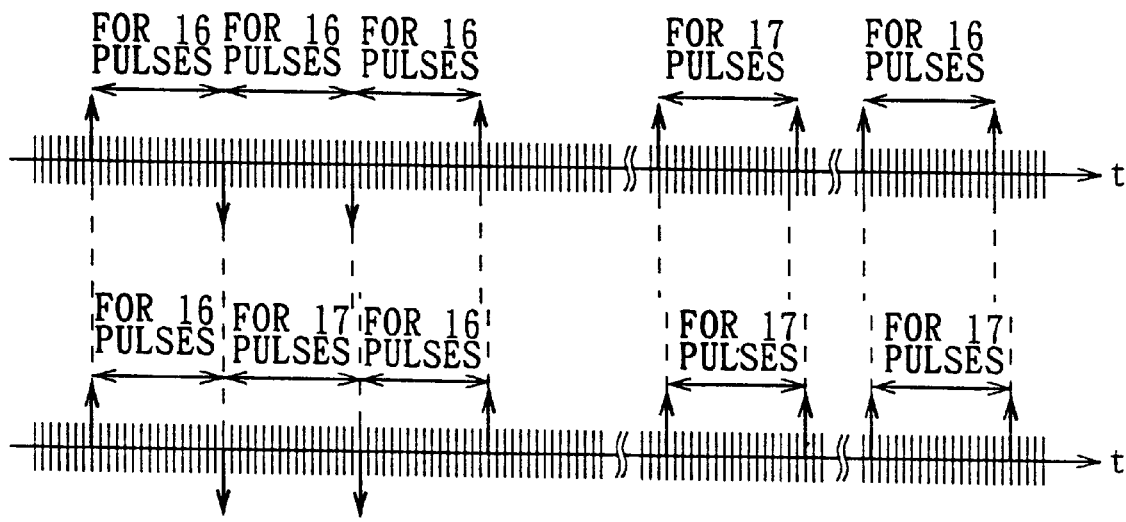
FIG. 11A and 11B are a time chart explaining an adjusting procedure of the transmission timing of the resampler shown in FIG. 8.

More specifically, as shown on the upper stage in FIG. 11A, under normal circumstances, i.e., in the case where each one symbol timing of the baseband signal S2 has no timing shift with respect to the clock signal S1, the resampler 34 outputs each one symbol unit with the time range of sixteen pulse waves of the clock signal S1. If the need for delaying the transmission timing arises by the determination according to the timing of the reception signal S6 (FIG. 8), or in the case where the delaying of timing occurs by an asynchronous factor between the baseband signal S2 and the clock signal S1, as shown on the lower stage in FIG. 11A, the resampler 34 sends out one symbol unit with the time range for seventeen pulse waves temporarily instead of the time range of one symbol unit of the baseband signal S2 having sixteen pulse waves of the clock signal S1, in order to delay the transmission timing.

Figure 11B:
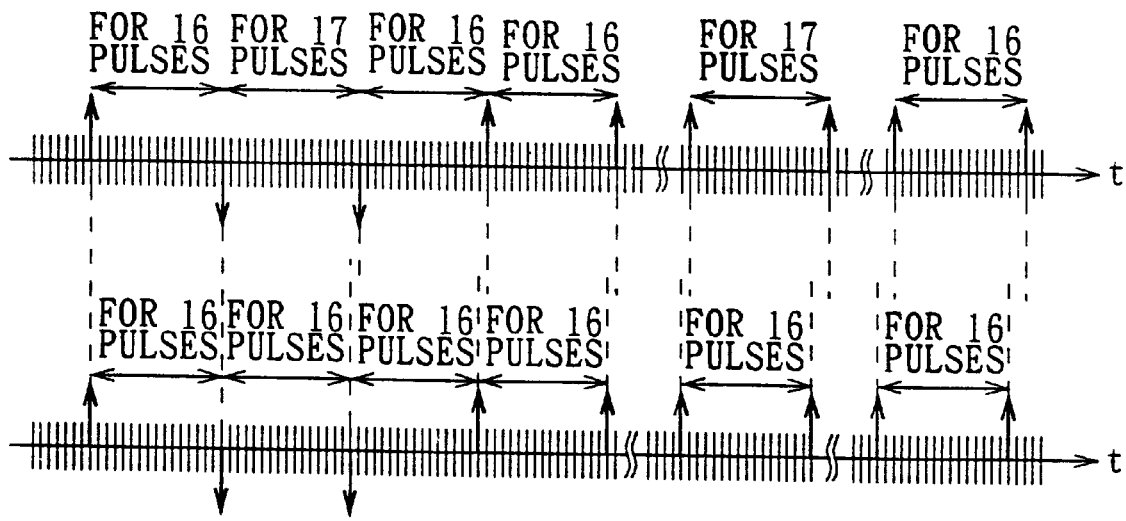

Furthermore, as shown on the upper stage of FIG. 11B, in the case of the timing shift according to jitter elements which occur because of an asynchronous factor between the clock signal S1 and the baseband signal S2, the resampler 34 sends out one symbol unit with the time range of seventeen pulse waves temporarily instead of the time range of 1 symbol unit of the baseband signal S2 having sixteen pulse waves of the clock signal S1 to delay the transmission timing. Moreover, in the case where the need for speeding up the transmission timing by the determination according to the timing of the reception signal S6 occurs, as shown on the lower stage in FIG. 11B, by countervailing this with the timing shift caused by an asynchronous factor between aforementioned frequencies in the delaying direction per the prescribed interval, the resampler 34 sends out the baseband signal S2 as it is at the normal time with the time range for sixteen pulse waves of the clock signal S1.

According to the foregoing construction, as shown in FIG. 8 the wireless communication terminal device 30 detects the timing of digital signal S7 (i.e., reception signal S6) by the demodulator 31 and controls the time control unit 35 according to the information signal S14 which is supplied from the demodulator 31 on the basis of the timing, in order to change the frequency of reference clock signal S16 which becomes a reference clock for generating the baseband signal S2. Thus, the wireless communication terminal device 30 temporarily changes the time range of one symbol unit of the baseband signal S2 to change the transmission timing of the transmission signal S5.

Thus, jitter elements are included in the baseband signal S2 when the time range of one symbol unit is temporarily changed. The wireless communication terminal device 30 controls the jitter elements by correcting the change of the transmission timing by the resampler 34.

More specifically, as shown in FIG. 9, the baseband signal S2 is supplied to the resampler 34 and it is detected that the time range is formed of a number of pulse waves of clock signal S1 per one symbol unit by the timing detecting unit 23. This detection result will be outputted to the interval change determining unit 26 and the number of timing shifts of the baseband signal S2 is calculated with respect to the clock signal S1. In the case of delaying the transmission timing, the calculation result is obtained by the plus value and the calculation result is held in the counter 27 as the counter value. The counter value is outputted to the interval changing unit 24. The interval changing unit 24 transmits the baseband signal S2 stored temporarily in the buffer unit 25 and to be sent out from the buffer unit 25 with the normal time range of sixteen pulse waves of the clock signal S1, once per the time interval corresponding to the counter value, with the time range of seventeen pulse waves. Moreover, the interval changing unit 24 informs the counter 27 whenever the change of the time range is performed, and the counter 27 decreases the holding counter value by one.

In the case where the transmission timing which is changed according to the reception signal S6 is changed greatly, i.e., in the case where one symbol unit of the baseband signal S2 being outputted with the time range of sixteen pulse waves of the clock signal S1 is changed temporarily to the time range of twenty pulse waves, if the change of the time range is performed as it is to transmit the transmission signal S5, the timing changed speed is deviated from the follow-up speed of the base station, and thus, there are cases where sure transmission of the transmission signal S5 to the other party cannot be maintained.

In the case of temporarily changing the transmission timing in the delaying direction, the wireless communication terminal device 30, by temporarily changing the time range of one symbol unit of the baseband signal S2 which is normally outputted with the time range of sixteen pulse waves of the clock signal S1 to the time range of seventeen pulse waves in order to transmit the baseband signal S2, can control jitter elements included in the baseband signal S2 on the basis of the timing change and decreases the spectrum distortion which occurs in the transmission signal S5. And at the same time, by gradually changing the time range per the prescribed time interval in order not to deviate from the follow-up speed of the base station, the wireless communication terminal device 30 can maintain the sure signal transmission to the other party side. Furthermore, the time range of one symbol unit can be changed by the transmission symbol generating unit 22 without considering the occurrence of jitter elements caused by the change of the transmission timing.

Furthermore, the wireless communication terminal device 30 decreases the jitter elements contained in the baseband signal S2 caused by an asynchronous factor between the clock signal S1 and the baseband signal S2 to be formed in the oscillator 1 by correcting the transmission timing change by means of the resampler 34.

More specifically, in case of speeding up the transmission timing, the calculation result which is obtained by the interval change determining unit 26 becomes minus value and the calculation result will be maintained in the counter 36 as a counter value. The counter value is outputted to the interval monitoring unit 37 and the interval monitoring unit 37 outputs the trigger signal to the counter 27 once per every time interval corresponding to the counter value and makes the counter 27 decrease the counter value by one. The counter 27 changes the time range of one symbol unit of the baseband signal S2 in accordance with the magnitude of overall timing changes at that point, considering the counter value having plus value for changing the timing in the direction of delaying timing and the counter value which is controlled at the counter 36 and for changing the timing in the direction of speeding up timing which is outputted from the interval monitoring unit 37 combined.

Furthermore, in the case where the counter value indicating the magnitude of overall timing changes become a minus value, that is the timing change is necessary in the direction of speeding up, the counter 27 does not change the time range of one symbol unit of the baseband signal S2 to be sent out.

More specifically, as described above, the jitter elements which occur due to the asynchronous factor between the clock signal S1 and the baseband signal S2 occur because the wireless communication terminal device 30 changes the 19.8 [MHz] frequency of the clock signal S1 to 19.6608 [MHz] by extracting pulse waves at the prescribed intervals from the clock signal S1 by means of the clock frequency converter 32 (FIG. 8) in order to generate the baseband signal S2 with 1.2288 [MHz] regulated by the CDMA system. Accordingly, the baseband signal S2 becomes a delayed signal in timing as compared with the 1.2375 [MHz] frequency which the clock signal S1 is frequency divided into 16. Accordingly, if the change of the transmission timing is not performed, it is apparent that the timing shift occurs in the delaying direction at the prescribed intervals in which pulse waves are extracted from the clock signal S1.

Accordingly, in the case where the counter value showing the magnitude of overall timing changes becomes minus, the counter 27 waits for a timing shift occurring in the delaying direction at the prescribed intervals in which pulse waves are extracted from the clock signal S1, and by countervailing the timing shift occurring in the delaying direction and the timing shift in the speeding up direction held as the counter value, makes the processing to change the time range of one symbol unit of the baseband signal S2 unnecessary at the time when the timing change in the speed up direction is necessary.

With this arrangement, the wireless communication terminal device 30 can make the oversampling magnification of the baseband signal S2 to only 16 times or 17 times by the resampler 34 and in both cases where the change of transmission timing is necessary and is not necessary according to the timing of the receive signal S6, the spectrum distortion which occurs in the transmission signal S5 caused by the jitter elements can be decreased.

Furthermore, the wireless communication terminal device 30 defines the clock signal S1 which is used as the reference signal as 19.8 [MHz]. At this point, the condition to be required for the clock signal S1 will be described from the first condition to the fourth condition.

Firstly, the oscillator 1 which is used in the wireless communication terminal device is generally a voltage controlled crystal oscillator, and especially the oscillator with 10-odd [MHz] to 20-odd [MHz] is easy to get. Accordingly, it is desirable to make the clock signal 10-odd [MHz] to 20-odd [MHz]. Secondly, in the wireless communication terminal device, the baseband signal with 1.2288 [MHz] will be oversampled to eight times or four times at the transmitting end and the receiving end, and the clock signal having eight times the 1.2288 [MHz] frequency at a minimum is necessary. Thirdly, since the channel interval of code division multiple access (CDMA) channel is regulated as 50 [kHz] according to J-STD-008 of the ANSI standard, the signal having a frequency formed of an integral multiple of 50 [kHz] is necessary as the tuning clock signal. Fourthly, J-STD-008 of the ANSI standard is designed compatible with the analog communication system. At this point, in the advanced mobile phone system (AMPS) which is one of the typical configurations of the analog communication system the channel interval is 30 [kHz]. Accordingly, it is to be desired that the frequency of the clock signal for tuning is integral multiple of 30 [kHz].

However, since it is difficult to fully satisfy the conditions described above, conditions may be omitted. At this point, the second condition that the clock signal have eight times of 1.2288 (MHz) frequency will be omitted from the conditions. However, according to the construction and methods described above, since the reference clock signal S15 having a frequency of an integral multiple of the baseband signal S2 can be formed artificially using the clock signal S1 having the frequency approximated to the frequency of an integral multiple of the baseband signal S2, it is no serious problem.

More specifically, if the signal has a frequency of an integer multiple of the baseband signal S2 according to the second condition and also satisfies the first condition, it is the signal having the frequency of 19.6608 [MHz]. But the frequency cannot satisfy the third condition. Accordingly, as the frequency approximated to 19.6608 [MHz] frequency and to satisfy the third and the fourth conditions, it is apparent that the signal having 19.8 [MHz] frequency is adequate as the clock signal S1 to be formed in the oscillator 1. In the wireless communication terminal device 30, since the jitter elements which occur due to the asynchronous frequency with the baseband signal S2 can be decreased by the resampler 34, the construction can be simplified assuming that the clock signal to be formed as a reference signal is only the clock signal S1.

According to the foregoing construction, in the case of changing the transmission timing temporarily in the delaying direction according to the timing which is detected from the receive signal S6, by changing temporarily the time range of one symbol unit of the baseband signal S2 to the time range of seventeen pulse waves of the clock signal S1 and sending this out, the jitter elements included in the baseband signal S2 by the change of timing can be controlled and the spectrum distortion which is generated in the transmission signal S5 can be decreased, and by gradually changing the time range at the prescribed time intervals in order not to deviate from the follow-up speed of the base station, the sure signal transmission to the other party can be maintained.

Furthermore, in the case where the magnitude of overall timing changes becomes minus, by waiting the timing shift that occurs in the delaying direction at the prescribed intervals at which pulse waves are extracted from the clock signal S1 and by countervailing the timing shift occurring in the delaying direction and the timing shift held as the counter value and necessary in the speeding up direction, the processing to change the time range of one symbol unit of the baseband signal S2 can be made unnecessary when the timing change in the speeding up direction is necessary, and the oversampling magnification of the baseband signal S2 can be only sixteen times or seventeen times. Moreover, the spectrum distortion that occurs in the transmission signal S5 due to jitter elements can be decreased in both cases where the transmission timing change is needed according to the timing of the receive signal S6 and the case where the change is not necessary, and by further decreasing the jitter elements to be generated due to asynchronous frequencies, the clock signal to be formed would be only the clock signal S1 and the construction can be simplified.

Accordingly, the spectrum distortion that occurs in the transmission signal S5 due to the jitter elements can be decreased with the simple construction in both cases where the transmission timing change is necessary according to the timing of the receive signal S6 and where the change is not necessary, and moreover, the wireless communication terminal device capable of maintaining the solid signal transmission to the other party can be realized.

In FIG. 5, the transmission symbol generating unit 22 generates the baseband signal S2 synchronized with the clock signal S1 and the transmission filter 20 performs the oversampling processing and the filter processing on the baseband signal S2. However, the present invention is not limited thereto and the baseband signal having the frequency asynchronous to the clock signal can be generated so long as the frequency is an approximate frequency synchronized with the clock signal. Also, in this case, jitter elements which are generated due to an asynchronous frequency can be decreased by adjusting the transmission timing using the transmission filter, and thereby the same effect as that of the embodiment can be obtained.

Furthermore, in FIG. 5, a digital filter 5 is provided, to perform the filter processing by calculation processing the pulse signal S3 obtained by sixteenfold oversampling performed by the transmission filter 20 based on the frequency of the clock signal S1 and to output the signal with the same frequency as it is. However, the present invention is not limited thereto but also the clock signal having the frequency corresponding to the sixteenfold oversampling magnification can be frequency divided into four and inputted to the digital filter, and the calculation processing as the filtering processing is performed only at the timing based on the input, and can be outputted as the quantization signal having the same frequency as the signal obtained by fourfold oversampling. With this arrangement, regardless of oversampling magnification of the resampler, the signal can be outputted as the signal generated with the optional oversampling magnification. In this case, the same effects as those of the embodiment can be obtained.

Further, in FIG. 8, the clock signal S1 generated at the oscillator 1 is inputted to the transmission filter 33 directly. However, the present invention is not limited thereto and the clock signal can be inputted after being frequency-divided into the prescribed magnification.

Moreover, in FIG. 8, the reference clock signal S15 having 19.6608 [MHZ] frequency which is generated at the clock frequency converter 32 is directly supplied to the A/D converter 11, the demodulator 31, the reception symbol processing unit 13, and the time control unit 35. However, the present invention is not limited thereto and the reference clock can be supplied to each unit after being frequency-divided into the prescribed magnification.

Further, in FIG. 8, the clock signal having 19.8 [MHZ] is generated at the oscillator 1 and the frequency of the clock signal S1 is converted into the frequency of 19.6608 [MHZ] synchronized with the baseband signal S2 by the clock frequency converter 32, in order to generate the reference clock signal S15. However, the present invention is not limited thereto and the clock signal having 19.6608 [MHZ] can be generated at the oscillator 1. In this case, since it is no longer necessary to convert the frequency of the clock signal to the frequency synchronized with the baseband signal, the construction can be simplified without providing the clock frequency converter 32.

Further, in FIGS. 5 and 8, the resamplers 21 and 34 perform the sixteenfold oversampling on the baseband signal S2. However, the present invention is not limited thereto and the resamplers can perform the fourfold oversampling. The effects of the present invention can be obtained regardless of the magnification of oversampling.

Furthermore, in FIG. 9, the number of timing shifts of the baseband signal S2 with respect to the clock signal S1 is controlled as the counter value at the counter 27, and in the case where the time range per one symbol unit which is outputted from the buffer unit 25 is changed by the interval changing unit 24, the counter is informed of the change from the interval changing unit and renews the counter value held by the counter 27. However, the present invention is not limited thereto and the same notification signal is supplied to the oversampling unit which is provided at the latter stage in the resampler 34, which is not shown in FIG. 9, to inform the execution of the timing change processing, and in this case, the oversampling magnification can be changed by the oversampling unit. That is, the notification signal may be used as a trigger signal to change the sampling magnification by the oversampling unit.

Further, in FIGS. 7 and 9, the buffer unit 25 temporarily stores the input baseband signal S2. However, the present invention is not limited thereto and a buffer unit which stores and outputs per one symbol unit can be provided or a FIFO buffer which stores multiple symbol units can be provided.

Furthermore, in FIGS. 7 and 9, the counters 27 and 36 in which the time intervals corresponding to the magnitude of timing shifts are memorized are provided. However, the present invention is not limited thereto and the uniform time intervals can be set. Anyway, the time intervals can be set in any manner, provided that they are set according to the characteristic of the wireless communication terminal device.

According to the present invention as described above, a data signal timing correction device of the present invention comprises: a timing difference detecting means, to which a data signal and a reference clock signal are supplied, for detecting direction and magnitude of timing shift of the data signal with respect to the reference clock signal; a data storage means, after supplying the data signal and a trigger signal, for storing the data signal and sequentially outputting the stored data signal in response to the trigger signal; and a timing correcting means, in the case where the detection resultant signal of the timing difference detecting means indicates that the magnitude of timing shift is zero, for supplying the trigger signal to the data storage means with a period corresponding to a predetermined number of clock of the reference clock signal, and on the other hand, in the case where the detection resultant signal indicates that the magnitude of timing shift is not zero, for supplying the trigger signal to the data storage means at earlier or later timing than timing of the period by one clock of the reference clock signal, only the number of times equal to the number of clock corresponding to the magnitude of timing shift, in accordance with the direction of the timing shift. In the case where the timing shift occurs in the transmission timing of the data signal with respect to the reference signal, the transmission timing of the data signal is shortened or widened in accordance with the magnitude of timing shifts by one clock timing to be corrected, and thereby jitter elements included in the data signal due to the timing shift can be dispersed in the time direction. Thus, the spectrum distortion caused by the jitter elements can be easily decreased while maintaining the sure signal transmission.

Furthermore, a wireless portable communication terminal of this invention comprises: a demodulating means for demodulating the reception signal to the former information signal and detecting timing of the reception signal, and in the case where change in transmission timing of the transmission signal is necessary on the basis of the detection result, for outputting a first control signal; a transmission symbol generating means for generating a baseband signal on the basis of a first reference clock signal or a second reference clock signal having a prescribed frequency; a signal generating means for generating the first reference clock signal; a timing control means, to which the first reference clock signal is supplied, for supplying the first reference clock signal to the transmission generating means when the first control signal is not supplied, and the other hand, for generating a second reference signal by dividing frequency of the first reference clock and supplying the second reference signal to the symbol generating means when the first control signal is supplied; a timing difference detecting means for detecting direction and magnitude of timing shift of the data signal with respect to the first reference clock signal; a data storage means, to which the data signal and a trigger signal are supplied, for storing the data signal and sequentially outputting the stored data signal in response to the trigger signal; a timing correcting means, to which the reference clock signal and the detection resultant signal of the timing difference detecting means are supplied, for supplying the trigger signal to the data storage means at a period corresponding to a prescribed number of clock of the reference clock signal when the detection resultant signal indicates that the magnitude of the timing shift is zero, and on the other hand, when the detection resultant signal indicates that the magnitude of the timing shift is not zero, for supplying the trigger signal to the data storage means at earlier or later timing than timing of the period by one clock of the reference clock signal, only the number of times equal to the clock number corresponding to the magnitude of timing shift, according to the direction of timing shift; a sampling means for sampling the data signal which is output from the data storage means, with the reference clock signal; and a digital filter for being supplied with a sample signal which is output from the sampling means. In the case where the timing shift in the delaying direction with respect to the first reference signal is detected, the transmission timing of the baseband signal is corrected and the counter value showing the timing shift in the direction of delaying when the timing shift is detected in the speeding up direction is reduced, and thereby the timing shift that occurs in the delaying direction can be countervailed by the timing shift occurred in the speeding up direction by using the timing change or the baseband signal asynchronous to the first reference signal. Thereby, the spectrum distortion due to the jitter elements can be easily decreased while maintaining the sure signal transmission and with the simple construction.

What is claimed is:

1. A data signal timing correction device comprising:

timing difference detecting means supplied with a data signal and a reference clock signal for detecting a direction and a magnitude of a timing shift of said data signal with respect to said reference clock signal;

data storage means supplied with said data signal and a trigger signal for storing said data signal and for sequentially outputting said stored data signal in response to said trigger signal; and timing correcting means supplied with said reference clock signal and a detection resultant signal of said timing difference detecting means for supplying said trigger signal to said data storage means with a period corresponding to a prescribed number of clock pulses of said reference clock signal when said detection resultant signal indicates that said magnitude of said timing shift is zero, and when said detection resultant signal indicates that said magnitude of said timing shift is not zero for supplying said trigger signal to said data storage means at one of an earlier and a later timing than a timing of said period by one clock pulse of said reference clock signal, only for a number of times equal to a number of clock pulses corresponding to said magnitude of said timing shift, in accordance with said direction of said timing shift detected by said timing difference detecting means, wherein said timing difference detecting means includes means for calculating a difference of a number of clock pulses of said reference clock signal per one symbol of said data signal with respect to a prescribed number of clock pulses of said reference clock signal as said magnitude of said timing shift, and wherein said timing correcting means includes a counter for loading a value of said difference from said timing difference detecting means and interval changing means for generating said trigger signal at one of an earlier and a later timing than said timing of said period by one clock pulse of said reference clock signal and for reducing said counter value by one, when a counter value of said counter is not zero.

2. The data signal timing correction device according to claim 1, wherein said timing correcting means supplies said trigger signal to said data storage means to change the symbol interval of said data signal at prescribed time intervals corresponding to a plurality of clock pulses.

3. The data signal timing correction device according to claim 2, wherein the larger said magnitude of timing shift, the more said timing correcting means shortens said prescribed time intervals.

4. A data signal timing correction device comprising:

timing difference detecting means supplied with a data signal and a reference clock signal for detecting a direction and a magnitude of a timing shift of said data signal with respect to said reference clock signal;

data storage means supplied with said data signal and a trigger signal for storing said data signal and for sequentially outputting said stored data signal in response to said trigger signal; and timing correcting means supplied with said reference clock signal and a detection resultant signal of said timing difference detecting means for supplying said trigger signal to said data storage means with a period corresponding to a prescribed number of clock pulses of said reference clock signal when said detection resultant signal indicates that said magnitude of said timing shift is zero, and when said detection resultant signal indicates that said magnitude of said timing shift is not zero for supplying said trigger signal to said data storage means at one of an earlier and a later timing than a timing of said period by one clock pulse of said reference clock signal, only for a number of times equal to a number of clock pulses corresponding to said magnitude of said timing shift, in accordance with said direction of said timing shift detected by said timing difference detecting means, wherein said timing difference detecting means includes means for calculating a number of clock pulses of said reference clock signal per one symbol of said data signal with respect to a prescribed number of clock pulses of said reference clock signal as said magnitude of said timing shift, and said timing correcting means includes a first counter for loading a value of said difference from said timing difference detecting means, when said magnitude of said timing shift is a plus value, interval changing means for generating said trigger signal at one of an earlier and a later timing than said timing of said period by one clock pulse of said reference clock signal and for reducing said first counter value by one, when a first counter value of said first counter is not zero, a second counter for loading a value of said difference from said timing difference detecting means, when said difference of said timing shift is a minus value, and interval monitoring means for reducing a value of said first counter by one at time intervals corresponding to said value of said second counter and for increasing said second counter value by one, when a value of said second counter is not zero.

5. A filter device comprising:

timing difference detecting means supplied with a data signal and a reference clock signal for detecting a direction and a magnitude of a timing shift of said data signal with respect to said reference clock signal;

data storage means supplied with said data signal and a trigger signal for storing said data signal and for sequentially outputting said stored data signal in response to said trigger signal;

timing correcting means supplied with said reference clock signal and a detection resultant signal of said timing difference detecting means for supplying said trigger signal to said data storage means with a period corresponding to a prescribed number of clock pulses of said reference clock signal when said detection resultant signal indicates that said magnitude of said timing shift is zero, and, when said detection resultant signal indicates that said magnitude of said timing shift is not zero, for supplying said trigger signal to said data storage means at one of an earlier and a later timing than a timing of said period by one clock pulse of said reference clock signal, only for a number of times equal to a number of clock pulses corresponding to said magnitude of said timing shift and in accordance with said direction of said timing shift;

sampling means for sampling said data signal outputted from said data storage means with said reference clock signal; and digital filter means supplied with a sample signal outputted from said sampling means for producing a filtered data signal, wherein said timing difference detecting means includes means for calculating a difference of a number of clock pulses of said reference clock signal per one symbol of said data signal with respect to a prescribed number of clock pulses of said reference clock signal as said magnitude of said timing shift, and wherein said timing correcting means includes a counter for loading a value of said difference from said timing difference detecting means and interval changing means for generating said trigger signal at one of an earlier and a later timing than said timing of said period by one clock pulse of said reference clock signal and for reducing said counter value by one, when a counter value of said counter is not zero.

6. A filter device comprising:

timing difference detecting means supplied with a data signal and a reference clock signal for detecting a direction and a magnitude of a timing shift of said data signal with respect to said reference clock signal;

data storage means supplied with said data signal and a trigger signal for storing said data signal and for sequentially outputting said stored data signal in response to said trigger signal;

timing correcting means supplied with said reference clock signal and a detection resultant signal of said timing difference detecting means for supplying said trigger signal to said data storage means with a period corresponding to a prescribed number of clock pulses of said reference clock signal when said detection resultant signal indicates that said magnitude of said timing shift is zero, and, when said detection resultant signal indicates that said magnitude of said timing shift is not zero, for supplying said trigger signal to said data storage means at one of an earlier and a later timing than a timing of said period by one clock pulse of said reference clock signal, only for a number of times equal to a number of clock pulses corresponding to said magnitude of said timing shift and in accordance with said direction of said timing shift;

sampling means for sampling said data signal outputted from said data storage means with said reference clock signal; and digital filter means supplied with a sample signal outputted from said sampling means for producing a filtered data signal, wherein said timing difference detecting means includes means for calculating a difference of a number of clock pulses of said reference clock signal per one symbol of said data signal with respect to a prescribed number of clock pulses of said reference clock signal as said magnitude of said timing shift, and said timing correcting means includes a first counter for loading a value of said difference from said timing difference detecting means, when said magnitude of said timing shift is a plus value, interval changing means for generating said trigger signal at one of an earlier and a later timing than said timing of said period by one clock pulse of said reference clock signal and for reducing said first counter value by one, when a first counter value of said first counter is not zero, a second counter when said difference of said timing shift is a minus value, and interval monitoring means for reducing a value of said first counter by one at time intervals corresponding to said value of said second counter and for increasing said second counter by one, when a value of said second counter is not zero.

7. The filter device according to claim 6, wherein said timing correcting means supplies said trigger signal to said data storage means to change the symbol interval of said data signal at prescribed time intervals corresponding to a plurality of said clock pulses.

8. The filter device according to claim 7, wherein the larger said magnitude of timing shift, the more said timing correcting means shortens said prescribed time intervals.

9. A wireless communication terminal device, comprising:

demodulating means for demodulating a reception signal to an original information signal and detecting timing of said reception signal, and when it is necessary to change transmission timing of a transmission signal on the basis of the detection result, for outputting a first control signal;

symbol generating means for generating a baseband signal on the basis of a first reference clock signal and a second reference clock signal having a prescribed frequency;

signal generating means for generating said first reference clock signal;

timing control means, to which said first reference clock signal is supplied, for supplying said first reference clock signal to said transmission symbol generating means when said first control signal is not supplied, and on the other hand, when said first control signal is supplied, for dividing a frequency of said first reference clock signal to generate said second reference signal and supplying said second reference signal to said symbol generating means;

timing difference detecting means, to which a data signal and a reference clock signal are supplied, for detecting a direction and magnitude of timing shift of said data signal with respect to said reference clock signal;

data storage means, to which said data signal and a trigger signal are supplied, for storing said data signal and sequentially outputting the stored data signal in response to said trigger signal;

timing correcting means, to which said reference clock signal and a detection resultant signal of said timing difference detecting means are supplied, for supplying said trigger signal to said data storage means with a period corresponding to the prescribed number of clocks of said reference clock signal when said detection resultant signal indicates that said magnitude of timing shift is zero, and on the other hand, when said detection resultant signal indicates that said magnitude of timing shift is not zero, for supplying said trigger signal to said data storage means at earlier or later timing than timing of said period by one clock of said reference clock signal, only the number of times equal to the number of clocks corresponding of said magnitude of timing shift, in accordance with said direction of timing shift;

sampling means for sampling said data signal which is outputted from said data storage means with said reference clock signal; and digital filter to which a sample signal which is outputted from said sampling means is supplied.

* * * * *